United States Patent
Rosewarne

(10) Patent No.: US 9,712,836 B2
(45) Date of Patent: Jul. 18, 2017

(54) METHOD, APPARATUS AND SYSTEM FOR ENCODING AND DECODING THE SIGNIFICANCE MAP FOR RESIDUAL COEFFICIENTS OF A TRANSFORM UNIT

(71) Applicant: CANON KABUSHIKI KAISHA, Tokyo (JP)

(72) Inventor: Christopher James Rosewarne, Gosford (AU)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 13/654,933

(22) Filed: Oct. 18, 2012

(65) Prior Publication Data

US 2013/0094589 A1 Apr. 18, 2013

(30) Foreign Application Priority Data

Oct. 18, 2011 (AU) ................................ 2011236109

(51) Int. Cl.
*H04N 19/44* (2014.01)
*H04N 19/129* (2014.01)
(Continued)

(52) U.S. Cl.
CPC ........... *H04N 19/44* (2014.11); *H04N 19/129* (2014.11); *H04N 19/13* (2014.11); *H04N 19/70* (2014.11); *H04N 19/91* (2014.11)

(58) Field of Classification Search
CPC ...... H04N 19/44; H04N 19/129; H04N 19/13; H04N 19/70; H04N 19/91
See application file for complete search history.

(56) References Cited

U.S. PATENT DOCUMENTS 7,379,608 B2 * 5/2008 Marpe .................. H04N 19/196
375/E7.138
2007/0285285 A1 * 12/2007 Puri et al. ....................... 341/50
(Continued)

FOREIGN PATENT DOCUMENTS

WO 2011/128303 A2 10/2011

OTHER PUBLICATIONS

ITU-T Telecommunication Standardization Sector of ITU, Advanced video coding for generic audiovisual services, Series H: Audiovisual and Multimedia Systems, Infrastructure of audiovisual services—Coding of moving video, Nov. 2007, pp. 1-564, ITU-T Recommendation H.264.

*Primary Examiner* — Trai Tran
*Assistant Examiner* — Christopher T Braniff
(74) *Attorney, Agent, or Firm* — Canon USA, Inc. I.P. Division

(57) ABSTRACT

Decoding includes identifying a scan pattern by which the bitstream is decoded. A set index value is decoded from the bitstream that specifies a set of flags according to the scan pattern that contains a last significant coefficient flag of the significance map, and individual significance flags are decoded and the decoded values written into the significance map according to the scan pattern and including the specified set of flags. Encoding a significance map includes identifying a scan pattern by which the significance map is scanned to form a list of significant coefficient flags. Encoding identifies a group of significant coefficient flags including a last significant coefficient flag and referencing the identified group with a scan index value. The significance map is then scanned in accordance with the scan pattern up to and including an entirety of the identified group and the scanned flag values then encoded.

17 Claims, 19 Drawing Sheets

(51) Int. Cl.
*H04N 19/13* (2014.01)
*H04N 19/70* (2014.01)
*H04N 19/91* (2014.01)

(56) References Cited

U.S. PATENT DOCUMENTS

| | | | |
|---|---|---|---|
| 2008/0219578 A1* | 9/2008 | Lee ........................ | H04N 19/13 382/247 |
| 2009/0175332 A1* | 7/2009 | Karczewicz et al. .... | 375/240.03 |
| 2011/0096834 A1* | 4/2011 | Cheon .................. | H04N 19/119 375/240.12 |

* cited by examiner

| 5 | 1 | 0 | 3 | 2 | 0 | 0 | 0 |
|---|---|---|---|---|---|---|---|
| 0 | 4 | 0 | 1 | 1 | 0 | 0 | 0 |
| 2 | 1 | 0 | 3 | 0 | 0 | 0 | 0 |
| 1 | 1 | 0 | 0 | 0 | 0 | 0 | 0 |
| 2 | 0 | 1 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 1 | 1 | 0 | 1 | 1 | 0 | 0 | 0 |
|---|---|---|---|---|---|---|---|
| 0 | 1 | 0 | 1 | 1 | 0 | 0 | 0 |
| 1 | 1 | 0 | 1 | 0 | 0 | 0 | 0 |
| 1 | 1 | 0 | 0 | 0 | 0 | 0 | 0 |
| 1 | 0 | 1 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

METHOD, APPARATUS AND SYSTEM FOR ENCODING AND DECODING THE SIGNIFICANCE MAP FOR RESIDUAL COEFFICIENTS OF A TRANSFORM UNIT

TECHNICAL FIELD

The present invention relates generally to digital video signal processing and, in particular, to a method, apparatus and system for encoding and decoding the significance map for residual coefficients of a transform unit. The present invention also relates to a computer program product including a computer readable medium having recorded thereon a computer program for determining the value of a significant coefficient flag for a residual coefficient of a transform unit.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of the Video Coding Experts Group (VCEG) of the Telecommunication Standardisation Sector (ITU-T) of the International Telecommunication Union (ITU) and members of the Moving Picture Experts Group (MPEG) of the International Organisations for Standardisation/International Electrotechnical Commission (ISO/IEC).

The Joint Collaborative Team on Video Coding (JCT-VC) has the goal of producing a new video coding standard to significantly outperform a presently existing video coding standard, known as "H.264/MPEG-4 AVC". The H.264/MPEG-4 AVC standard is itself a large improvement on previous video coding standards, such as MPEG-4 and ITU-T H.263. The new video coding standard under development has been named "high efficiency video coding (HEVC)". The JCT-VC is also considering implementation challenges arising from technology proposed for high efficiency video coding (HEVC) that create difficulties when scaling implementations of the standard to operate at high resolutions or high frame rates.

One area of the H.264/MPEG-4 AVC video coding standard that presents difficulties for achieving high compression efficiency is the coding of residual coefficients used to represent video data. Video data is formed by a sequence of frames, with each frame having a two-dimensional array of samples. Typically, frames include one luminance and two chrominance channels. A video encoder compresses the video data into a bitstream by converting the video data into a sequence of syntax elements.

In high efficiency video coding (HEVC) and in H.264/MPEG-4 AVC, a prediction for a current frame is derived, based on reference sample data either from other frames, or from other regions within the current frame that have been previously decoded. The difference between the prediction and the desired sample data is known as the residual. A frequency domain representation of the residual is a two-dimensional array of residual coefficients. By convention, the upper-left corner of the two-dimensional array contains residual coefficients representing low-frequency information.

In typical video data, the majority of the changes in sample values are gradual, resulting in a predominance of low-frequency information within the residual. This manifests as larger magnitudes for residual coefficients located in the upper-left corner of the two-dimensional array.

A context adaptive binary arithmetic coding (CABAC) scheme is defined within the high efficiency video coding (HEVC) standard under development. In the high efficiency video coding (HEVC) standard under development, when context adaptive binary arithmetic coding (CABAC) is enabled, each syntax element is expressed as a sequence of bins, where the bins are selected from a set of available bins. Creating such a sequence of bins from a syntax element is known as "binarising" the syntax element.

When implementing context adaptive binary arithmetic coding (CABAC), the binary arithmetic decoding algorithm has a feedback dependency loop. The feedback dependency loop is between a context selector, for determining which context from the context model to use for a current bin, a context modeller, for updating context information of each bin, and an arithmetic coder. The context selector uses values of previously decoded bins to determine the context for the current bin. In an encoder, the process of context selection is referred to as "binarisation". In a decoder, the process of context selection is referred to as "inverse binarisation". The length of the feedback dependency loop limits bin throughput achievable in hardware implementations of binary arithmetic coding (BAC) for a given clock frequency. The limitation in bin throughput is relevant when an implementation is required to provide higher bin throughput.

The property of low-frequency information being predominant in the upper-left corner of the two-dimensional array of residual coefficients may be exploited by the chosen binarisation scheme to minimise the size of the residual coefficients in the bitstream.

A provided scan pattern enables scanning the two-dimensional array of residual coefficients into a one-dimensional array. In the two-dimensional array of residual coefficients, those having a nonzero value are referred to as significant residual coefficients and those having zero value are referred to as non-significant residual coefficients. A two-dimensional array representing only the "significant" status of each residual coefficient is referred to as a significance map. By scanning the significance map using the provided scan pattern, the location of the last significant residual coefficient in the two-dimensional significance map may be determined. Scan patterns may be horizontal, vertical, diagonal or zig-zag.

The location of the last significant residual coefficient is binarised into the bitstream, requiring two syntax elements to represent the X and Y component of the location. As the residual coefficients located after the last significant residual coefficient are known to be non-significant there is no need to store them in the bitstream. The significant status of residual coefficients located prior to the last significant residual coefficient is not known and therefore this portion of the significance map must be stored in the bitstream.

There are two disadvantages to this scheme. Firstly, in order to encode the location of the last significant residual coefficient in the two-dimensional significance map, two indices must be stored in the bitstream. Secondly, as the last significant residual coefficient could be located in any position within the two-dimensional significance map, implementations which encode multiple significant residual coefficient flags per clock cycle must have additional multiplexing logic in order to support encoding a variable number of significant residual coefficients per clock cycle. This additional multiplexing logic increases the logic path delay in the circuit, reducing the maximum achievable clock speed of a high efficiency video coding (HEVC) hardware implementation.

Higher bin throughput is required to support video formats offering higher frame rates and higher resolutions, such as ultra-high definition television (UHDTV), super hi-vision (SHV) or wide quad high definition (WQHD).

SUMMARY

It is an object of the present invention to substantially overcome, or at least ameliorate, one or more disadvantages of existing arrangements.

In accordance with one aspect of the present disclosure there is provided a method of decoding a significance map from an encoded bitstream, the method comprising:

identifying a scan pattern by which the bitstream can be decoded;

decoding a set index value from the bitstream that specifies a set of flags according to the scan pattern that contains a last significant coefficient flag of the significance map; and decoding individual significance flags and writing the decoded values into the significance map according to the scan pattern and including an entirety of the specified set of flags.

In one implementation the decoding proceeds according to a forward scan pattern and concludes with a decoding of the entirety of the specified set. In another implementation, the decoding proceeds according to a backward scan pattern and commences with a decoding of the entirety of the specified set. In either case, the scan pattern is one of horizontal, vertical, diagonal and zig-zag.

Typically the set of flags has at least one boundary coincident with a boundary of a transform unit associated with the significance map.

According to another aspect of the present disclosure, there is provided a method of encoding a significance map in a digital signal coding system, the method comprising:

identifying a scan pattern by which the significance map can be scanned to form a list of significant coefficient flags;

subject to the scan pattern, identifying a group of significant coefficient flags including a last significant coefficient flag and referencing the identified group with a scan index value;

scanning the significance map in accordance with the scan pattern up to and including an entirety of the identified group; and encoding the scanned flag values.

Again, the scan pattern may be one of horizontal, vertical, diagonal and zig-zag. Further boundaries of the group occur at the boundary of the significance map. In a specific implementation at least one group comprises at last two diagonal scans of the significance map.

According to another aspect of the present disclosure, there is provided a method of encoding a significant flag boundary for a significance map of a transform unit, the transform unit encoding residual coefficients of video data, the method comprising:

providing a scan direction that determines the encoding order for significance flags of the transform unit;

identifying a location of a last significant flag to encode in the transform unit;

selecting, based on the scan direction, a set from a plurality of predetermined sets that contains the identified location of the last significant flag, each of the predetermined sets containing a plurality of transform unit locations; and storing an index of the selected set as a reference to a plurality of the transform locations to encode the significant flag boundary.

Preferably, each of the plurality of predetermined sets is a scan line of the transform unit.

Other aspects are also disclosed.

BRIEF DESCRIPTION OF THE DRAWINGS

At least one embodiment of the present invention will now be described with reference to the following drawings, in which:

FIGS. 14A and 14B show a transform unit and a corresponding significance map;

FIG. 14C schematically shows a scanned one-dimensional list of flags from the example of FIGS. 14A and 14B for encoding according to prior art arrangements;

FIG. 14D schematically shows a scanned one-dimensional list of flags for the example of FIGS. 14A and 14B for encoding according to the present disclosure;

DETAILED DESCRIPTION INCLUDING BEST MODE

Figure 1:
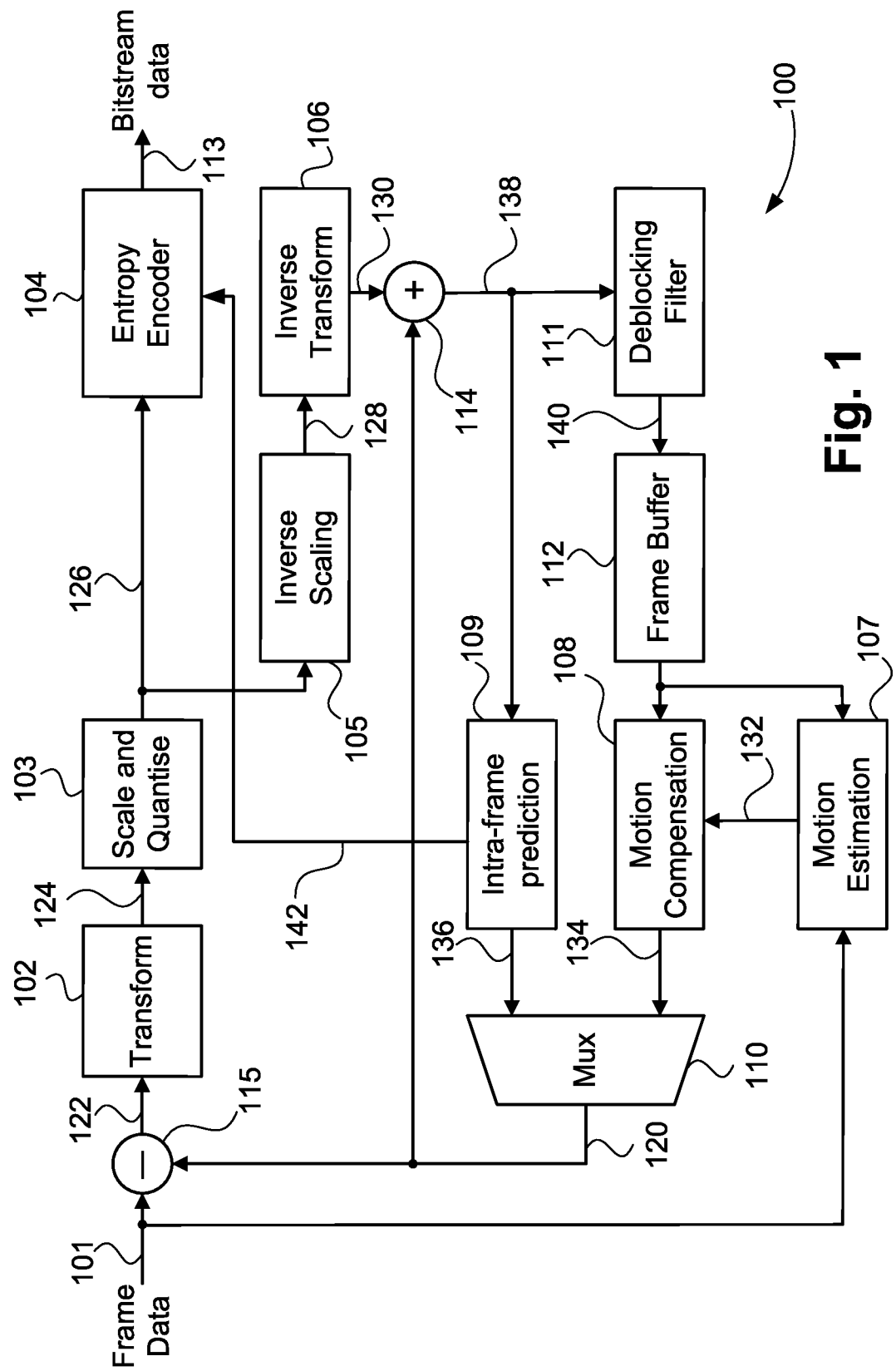
FIG. 1 is a schematic block diagram showing functional modules of a video encoder.

Where reference is made in any one or more of the accompanying drawings to steps and/or features, which have the same reference numerals, those steps and/or features have for the purposes of this description the same function(s) or operation(s), unless the contrary intention appears.

In a video encoder or video decoder, as separate context information is available for each bin, context selection for bins provides a means to improve coding efficiency. In particular, coding efficiency may be improved by selecting a particular bin such that statistical properties from previous instances of the bin, where the associated context information was used, correlate with statistical properties of a current instance of the bin. Such context selection frequently utilises spatially local information to determine the optimal context.

In binary arithmetic coding (BAC), each frame of video data is divided into hierarchical sets of coding units (CUs), representable for example as a coding unit (CU) tree. A top level of each coding unit is referred to as a largest coding unit (LCU). The largest coding unit (LCU) has a maximum size, with edge dimensions being a power of two and having equal width and height. Each frame is decomposed into an array of largest coding units (LCUs). Each largest coding unit (LCU) may be subdivided into four coding units (CUs), each having half the width and height of a parent largest coding unit (LCU). Each of the coding units (CUs) may be further subdivided into four coding units (CUs). Such a subdivision process may be applied recursively, enabling coding units (CUs) to be defined down to a minimum supported size. The hierarchy of coding units (CUs) forms a coding unit (CU) tree.

At leaf nodes of the coding unit (CU) tree, residual coefficient data may be encoded into a bitstream. Each "residual coefficient" is a number representing image characteristics within a transform unit in the frequency (DCT) domain and occupying a unique location within the transform unit. In this instance, a transform unit (TU) tree is created where the spatial region occupied by the coding unit (CU) is further subdivided into individual "transform units (TUs)". A transform unit is a block of residual data samples that may be transformed between the spatial and the frequency domains. In the frequency domain, the transform unit (TU) encodes the residual data samples as residual coefficient data. Transform units are sized in powers of two (2), ranging from 4×4 data samples to 32×32 data samples for a "Luma" channel, and 2×2 to 16×16 data samples for a "Chroma" channel. The leaf nodes of the transform unit (TU) tree may contain either a transform unit (TU) or nothing at all, in the case where no residual coefficient data is required.

Modified discrete cosine transforms (DCTs) or modified discrete sine transforms (DSTs) may be used to implement the residual transform Implementations of the residual transform are configured to support each required transform unit (TU) size. In a video encoder, the residual coefficients from the residual transform are scaled and quantised. The scaling and quantisation reduces the magnitude of the coefficients, reducing the size of the data coded into the bitstream at the cost of reducing the image quality.

Figure 2:
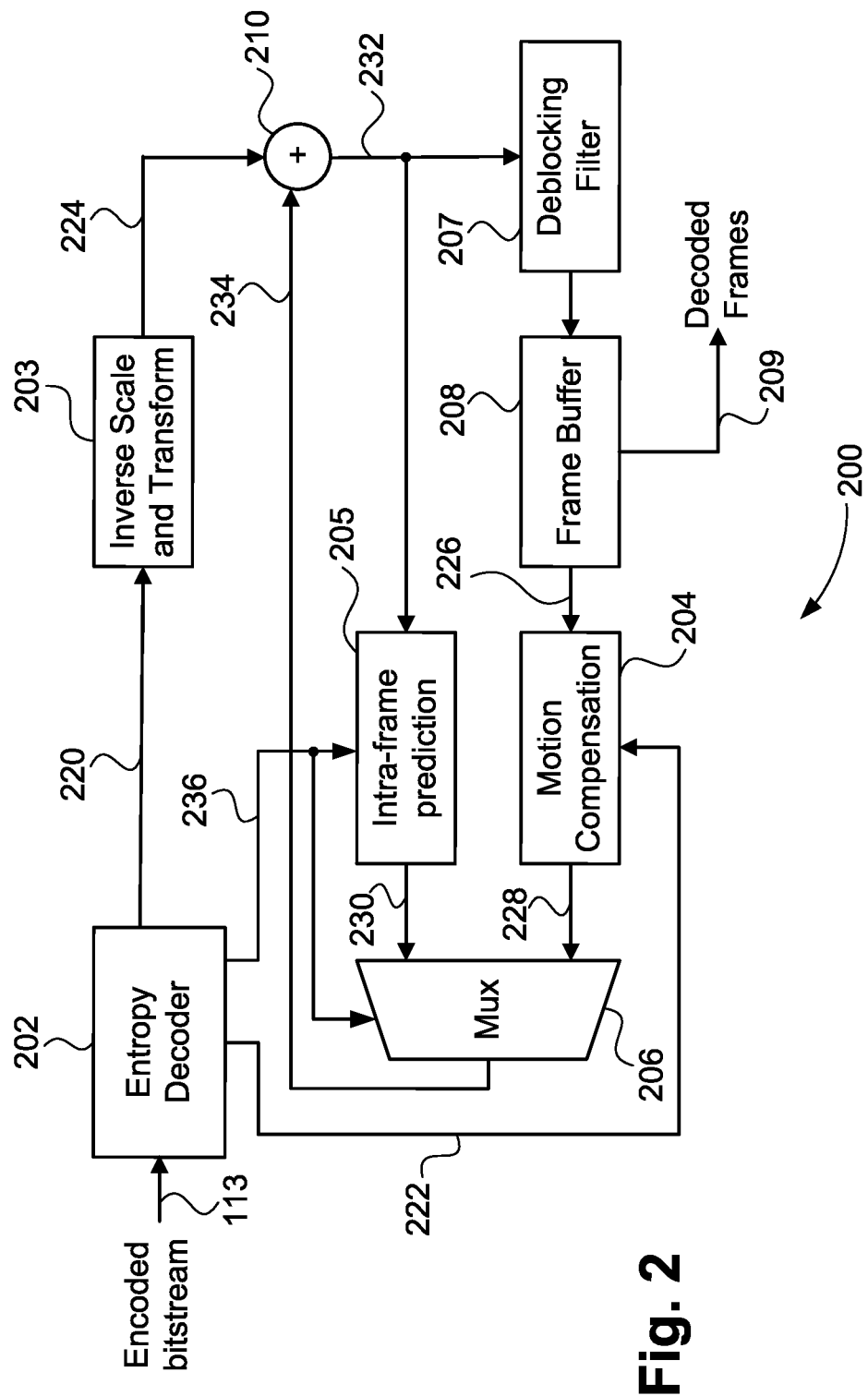
FIG. 2 is a schematic block diagram showing functional modules of a video decoder.

FIG. 1 is a schematic block diagram showing functional modules of a video encoder 100. FIG. 2 is a schematic block diagram showing functional modules of a corresponding video decoder 200. The video encoder 100 and video decoder 200 may be implemented using a general-purpose computer system 300, as shown in FIGS. 3A and 3B where the various functional modules may be implemented by dedicated hardware within the computer system 300, by software executable within the computer system 300, or alternatively by a combination of dedicated hardware and software executable within the computer system 300.

Figure 3A:
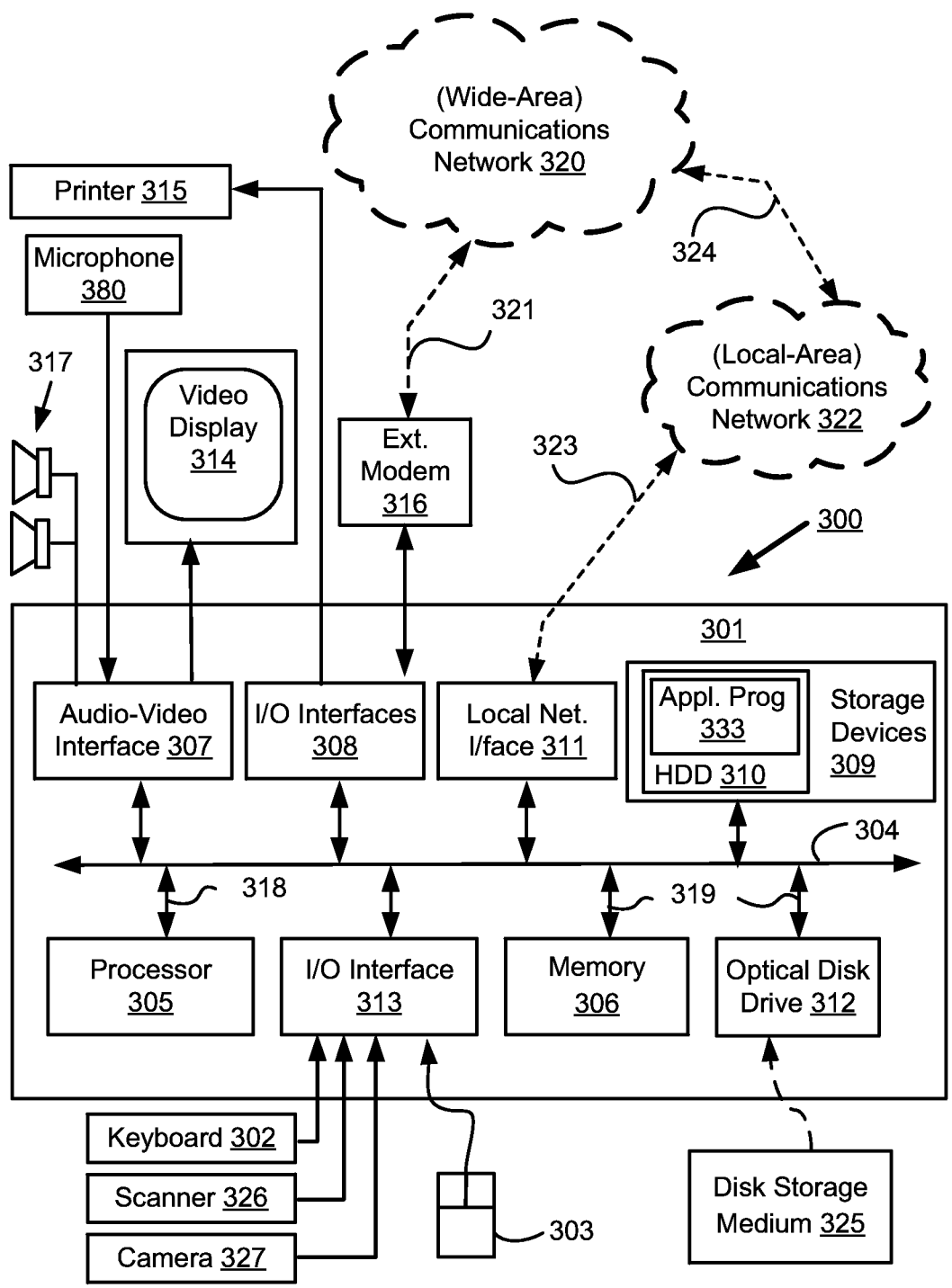
FIGS. 3A and 3B form a schematic block diagram of a general purpose computer system upon which the encoder and decoder of FIGS. 1 and 2, respectively, may be practiced.
Figure 3B:
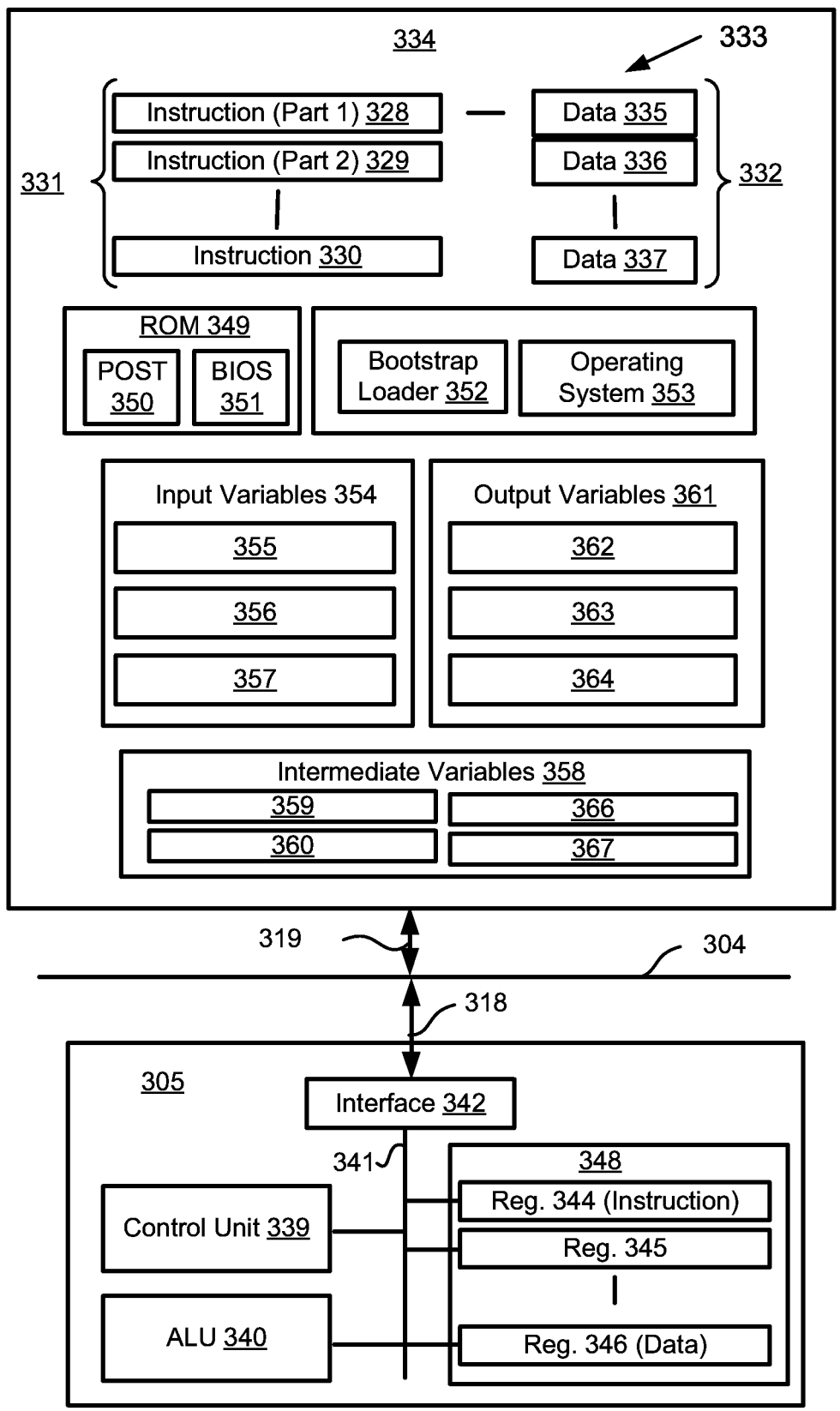

As seen in FIG. 3A, the computer system 300 includes: a computer module 301; input devices such as a keyboard 302, a mouse pointer device 303, a scanner 326, a camera 327, and a microphone 380; and output devices including a printer 315, a display device 314 and loudspeakers 317. An external Modulator-Demodulator (Modem) transceiver device 316 may be used by the computer module 301 for communicating to and from a communications network 320 via a connection 321. The communications network 320 may be a wide-area network (WAN), such as the Internet, a cellular telecommunications network, or a private WAN. Where the connection 321 is a telephone line, the modem 316 may be a traditional "dial-up" modem. Alternatively, where the connection 321 is a high capacity (e.g., cable) connection, the modem 316 may be a broadband modem. A wireless modem may also be used for wireless connection to the communications network 320.

The computer module 301 typically includes at least one processor unit 305, and a memory unit 306. For example, the memory unit 306 may have semiconductor random access memory (RAM) and semiconductor read only memory (ROM). The computer module 301 also includes an number of input/output (I/O) interfaces including: an audio-video interface 307 that couples to the video display 314, loudspeakers 317 and microphone 380; an I/O interface 313 that couples to the keyboard 302, mouse 303, scanner 326, camera 327 and optionally a joystick or other human interface device (not illustrated); and an interface 308 for the external modem 316 and printer 315. In some implementations, the modem 316 may be incorporated within the computer module 301, for example within the interface 308. The computer module 301 also has a local network interface 311, which permits coupling of the computer system 300 via a connection 323 to a local-area communications network 322, known as a Local Area Network (LAN). As illustrated in FIG. 3A, the local communications network 322 may also couple to the wide network 320 via a connection 324, which would typically include a so-called "firewall" device or device of similar functionality. The local network interface 311 may comprise an Ethernet™ circuit card, a Bluetooth™ wireless arrangement or an IEEE 802.11 wireless arrangement; however, numerous other types of interfaces may be practiced for the interface 311.

The I/O interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 300. Typically, any of the HDD 310, optical drive 312, networks 320 and 322, or camera 327 may for a source for video data to be encoded, or, with the display 314, a destination for decoded video data to be stored or reproduced.

Figure 10:
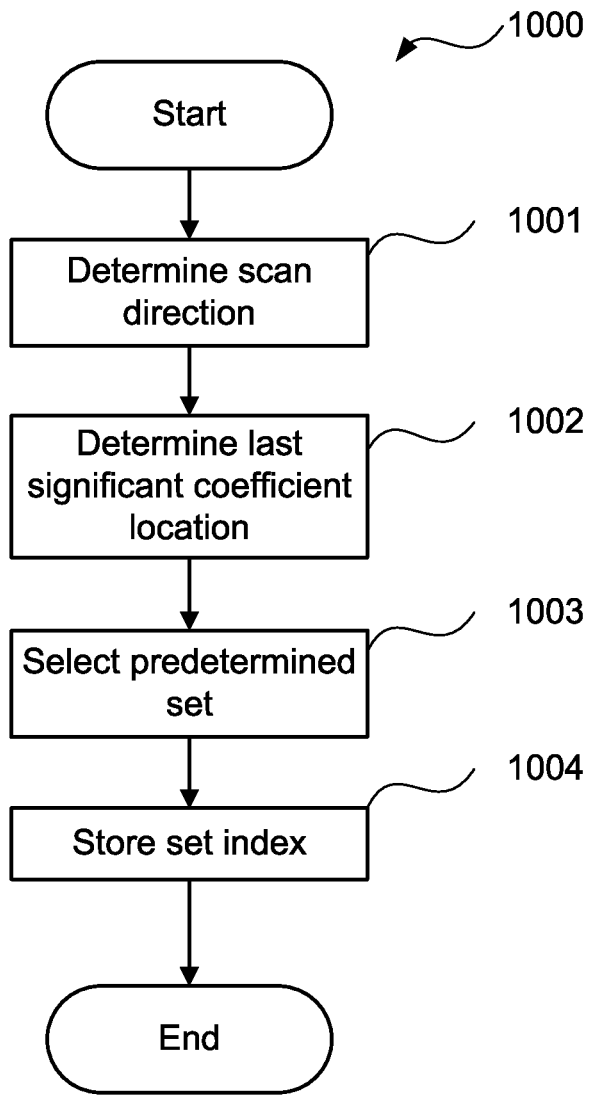
FIG. 10 is a diagram showing a method for encoding a significance map into a bitstream.
Figure 11:
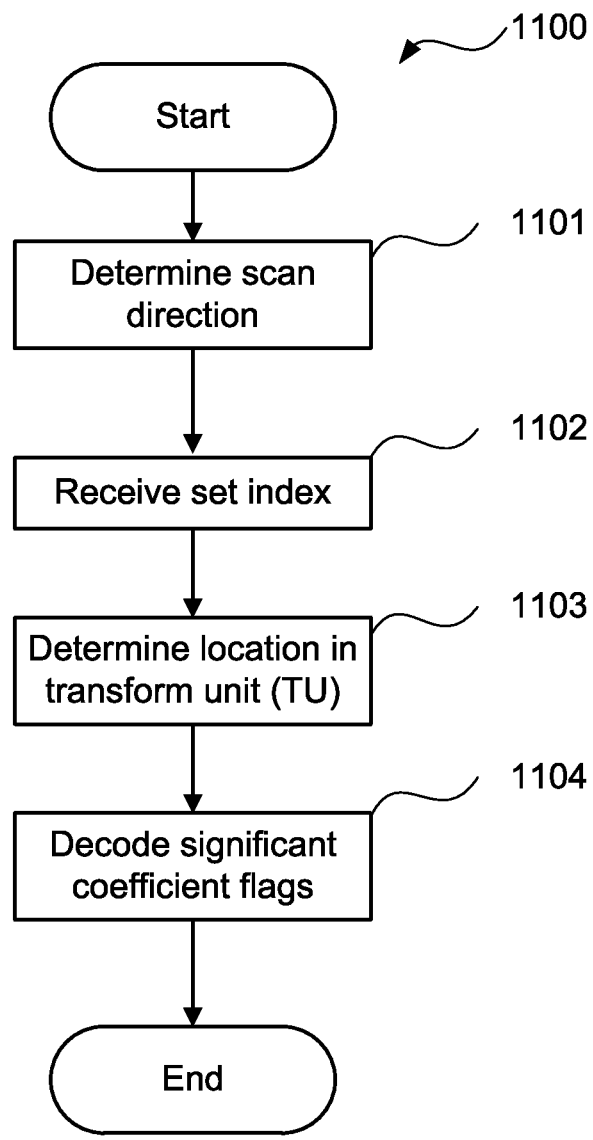
FIG. 11 is a diagram showing a method for decoding a significance map from a bitstream.

The components 305 to 313 of the computer module 301 typically communicate via an interconnected bus 304 and in a manner that results in a conventional mode of operation of the computer system 300 known to those in the relevant art. For example, the processor 305 is coupled to the system bus 304 using a connection 318. Likewise, the memory 306 and optical disk drive 312 are coupled to the system bus 304 by connections 319. Examples of computers on which the described arrangements can be practised include IBM-PC's and compatibles, Sun Sparcstations, Apple Mac™ or alike computer systems.

Where appropriate or desired, the encoder 100 and the decoder 200, as well as methods described below, may be implemented using the computer system 300 wherein the encoder 100, the decoder 200 and the processes of FIGS. 10 and 11, to be described, may be implemented as one or more software application programs 333 executable within the computer system 300. In particular, the encoder 100, the decoder 200 and the steps of the described methods are effected by instructions 331 (see FIG. 3B) in the software 333 that are carried out within the computer system 300. The software instructions 331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 300 from the computer readable medium, and then executed by the computer system 300. A computer readable medium having such software or computer program recorded on the computer readable medium is a computer program product. The use of the computer program product in the computer system 300 preferably effects an advantageous apparatus for implementing the encoder 100, the decoder 200 and the described methods.

The software 333 is typically stored in the HDD 310 or the memory 306. The software is loaded into the computer system 300 from a computer readable medium, and executed by the computer system 300. Thus, for example, the software 333 may be stored on an optically readable disk storage medium (e.g., CD-ROM) 325 that is read by the optical disk drive 312.

In some instances, the application programs 333 may be supplied to the user encoded on one or more CD-ROMs 325 and read via the corresponding drive 312, or alternatively may be read by the user from the networks 320 or 322. Still further, the software can also be loaded into the computer system 300 from other computer readable media. Computer readable storage media refers to any non-transitory tangible storage medium that provides recorded instructions and/or data to the computer system 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 301. Examples of transitory or non-tangible computer readable transmission media that may also participate in the provision of the software, application programs, instructions and/or video data or encoded video data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory modules (including the HDD 309 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306 of FIG. 3A. A hardware device such as the ROM 349 storing software is sometimes referred to as firmware. The POST program 350 examines hardware within the computer module 301 to ensure proper functioning and typically checks the processor 305, the memory 334 (309, 306), and a basic input-output systems software (BIOS)module 351, also typically stored in the ROM 349, for correct operation. Once the POST program 350 has run successfully, the BIOS 351 activates the hard disk drive 310 of FIG. 3A. Activation of the hard disk drive 310 causes a bootstrap loader program 352 that is resident on the hard disk drive 310 to execute via the processor 305. This loads an operating system 353 into the RAM memory 306, upon which the operating system 353 commences operation. The operating system 353 is a system level application, executable by the processor 305, to fulfil various high level functions, including processor management, memory management, device management, storage management, software application interface, and generic user interface.

The operating system 353 manages the memory 334 (309, 306) to ensure that each process or application running on the computer module 301 has sufficient memory in which to execute without colliding with memory allocated to another process.

Furthermore, the different types of memory available in the system 300 of FIG. 3A must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

As shown in FIG. 3B, the processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal busses 341 functionally interconnect these functional modules. The processor 305 typically also has one or more interfaces 342 for communicating with external devices via the system bus 304, using a connection 318. The memory 334 is coupled to the bus 304 using a connection 319.

The application program 333 includes a sequence of instructions 331 that may include conditional branch and loop instructions. The program 333 may also include data 332 which is used in execution of the program 333. The instructions 331 and the data 332 are stored in memory locations 328, 329, 330 and 335, 336, 337, respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328 and 329.

In general, the processor 305 is given a set of instructions which are executed therein. The processor 305 waits for a subsequent input, to which the processor 305 reacts to by executing another set of instructions. Each input may be provided from one or more of a number of sources, including data generated by one or more of the input devices 302, 303, data received from an external source across one of the networks 320, 302, data retrieved from one of the storage devices 306, 309 or data retrieved from a storage medium 325 inserted into the corresponding reader 312, all depicted in FIG. 3A. The execution of a set of the instructions may in some cases result in output of data. Execution may also involve storing data or variables to the memory 334.

The encoder 100, the decoder 200 and the described methods use input variables 354, which are stored in the memory 334 in corresponding memory locations 355, 356, 357. The encoder 100, the decoder 200 and the described methods produce output variables 361, which are stored in the memory 334 in corresponding memory locations 362, 363, 364. Intermediate variables 358 may be stored in memory locations 359, 360, 366 and 367.

Referring to the processor 305 of FIG. 3B, the registers 344, 345, 346, the arithmetic logic unit (ALU) 340, and the control unit 339 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Figure 5:
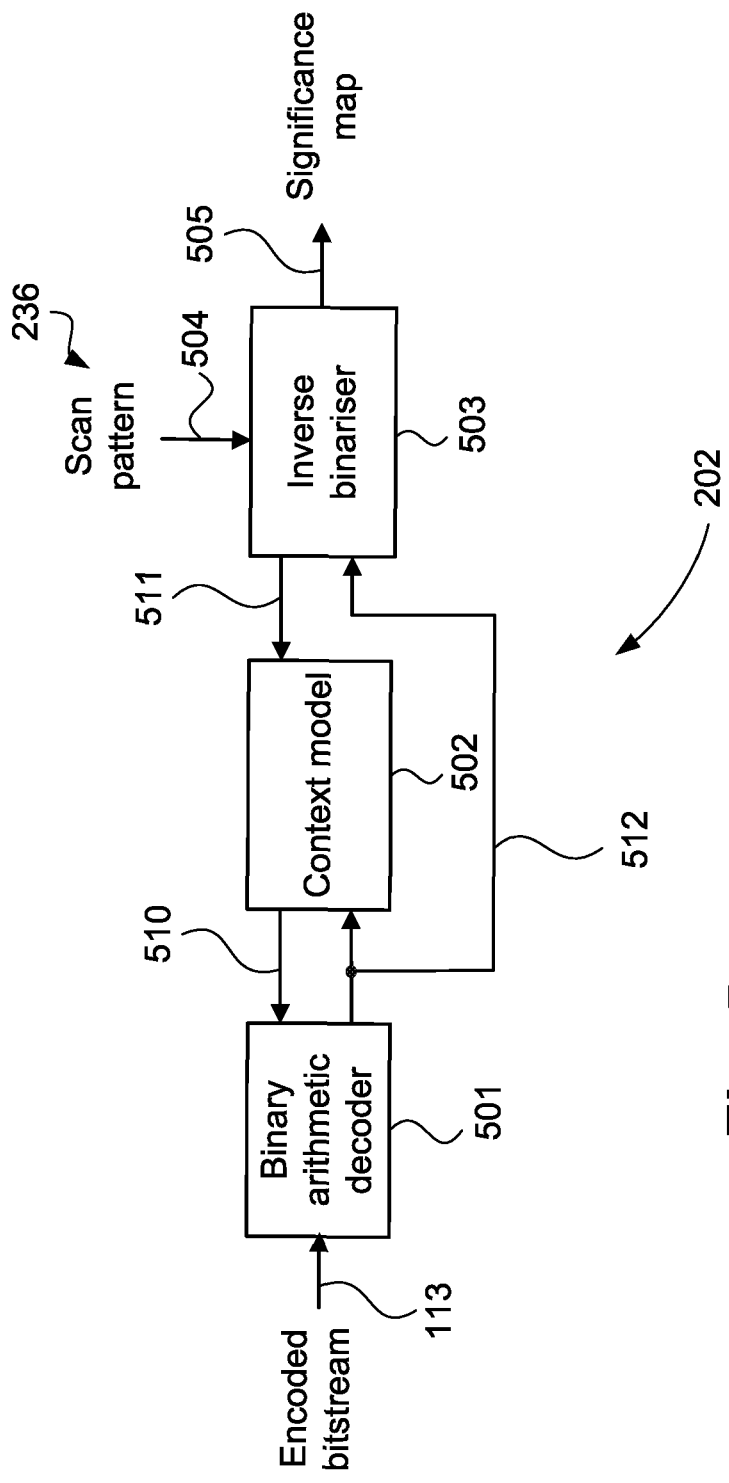
FIG. 5 is a schematic block diagram showing functional modules of an entropy decoder.

Each step or sub-process in the processes of FIGS. 5, 7 and 14 is associated with one or more segments of the program 333 and is performed by the register section 344, 345, 347, the ALU 340, and the control unit 339 in the processor 305 working together to perform the fetch, decode, and execute cycles for every instruction in the instruction set for the noted segments of the program 333.

The encoder 100, the decoder 200 and the described methods may alternatively be implemented in dedicated hardware such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories.

As described above, the video encoder 100 may be implemented as one or more software code modules of the software application program 333 resident on the hard disk drive 305 and being controlled in its execution by the processor 305. In particular the video encoder 100 comprises modules 102 to 112, 114 and 115 which may each be implemented as one or more software code modules of the software application program 333.

Although the video encoder 100 is an example of a high efficiency video coding (HEVC) video decoding pipeline, processing stages performed by the modules 102 to 112, 114 and 115 are common to other video codecs such as VC-1 or H.264/MPEG-4 AVC. The video encoder 100 receives unencoded frame data 101 as a series of frames consisting of luminance and chrominance samples. The video encoder 100 divides each frame of the frame data 101 into one or more slices which contain an integer number of coding units. Each coding unit is encoded sequentially by further dividing the coding unit into two-dimensional arrays of data samples known as blocks. The video encoder 100 operates by outputting from a multiplexer module 110 a prediction 120 for each array of data samples. A difference module 115 outputs the difference between a prediction and a corresponding array of data samples received from the frame data 101, the difference being known as residual data samples 122. The prediction 120 from the multiplexer module 110 will be described in more detail below.

The residual data samples 122 from the difference module 115 are received by a transform module 102, which converts the difference from a spatial representation to a frequency domain representation to create transform coefficients 124. For the H.264/MPEG-4 AVC video coding standard, the conversion to the frequency domain representation is implemented using a modified discrete cosine transform (DCT), in which a traditional DCT is modified to be implemented using shifts and additions. The transform coefficients 124 are then input to a scale and quantise module 103 where the coefficients are scaled and quantised to produce residual coefficients 126. The scale and quantisation process results in a loss of precision. The residual coefficients 126 are taken as input to an inverse scaling module 105 which reverses the scaling performed by the scale and quantise module 103 to produce rescaled transform coefficients 128, which are rescaled versions of the residual coefficients 126. The residual coefficients 126 are also taken as input to an entropy encoder module 104 which encodes the residual coefficients in an output bitstream 113. Due to the loss of precision resulting from the scale and quantise module 103, the rescaled transform coefficients 128 are not identical to the original transform coefficients 124. The rescaled transform coefficients 128 from the inverse scaling module 105 are then output to an inverse transform module 106. The inverse transform module 106 performs an inverse transform from the frequency domain to the spatial domain to produce a spatial-domain representation 130 of the rescaled transform coefficients 128 identical to a spatial domain representation that is produced at a decoder.

A motion estimation module 107 produces motion vectors 132 by comparing the frame data 101 with previous frame data stored in a frame buffer module 112 configured within the memory 306. The motion vectors 132, are then input to a motion compensation module 108 which produces inter-predicted reference samples 134 by filtering samples stored in the frame buffer module 112, taking into account a spatial offset derived from the motion vectors 132. Not illustrated in FIG. 1, the motion vectors 132 are also passed as syntax elements to the entropy encoder module 104 for coding in the output bitstream 113. An intra-frame prediction module 109 produces intra-predicted reference samples 136 using samples 138 obtained from a summation module 114, which sums the output 120 of the multiplexer module 110 and the output 130 from the inverse transform module 106.

Coding units may be coded using intra-prediction or inter-prediction methods. The decision as to whether to use intra-prediction or inter-prediction is made according to a rate-distortion trade-off between desired bit-rate of the resulting bitstream 113 and the amount of image quality distortion introduced by either the intra-prediction or inter-prediction method. The multiplexer module 110 selects either the intra-predicted reference samples 136 from the intra-frame prediction module 109 or the inter-predicted reference samples 134 from the motion compensation block 108, depending on a current prediction mode 142, determined by control logic not illustrated but well-known in the art. The prediction mode 142 is also provided to the entropy encoder 104 and as such is used to determine or otherwise establish the scan order of transform units as will be described. Inter-frame prediction uses only a diagonal scan order, whereas intra-frame prediction may use the diagonal scan, a horizontal scan or a vertical scan order.

The summation module 114 produces a sum 138 that is input to a deblocking filter module 111. The deblocking filter module 111 performs filtering along block boundaries, producing deblocked samples 140 that are written to the frame buffer module 112 configured within the memory 306. The frame buffer module 112 is a buffer with sufficient capacity to hold data from multiple past frames for future reference.

In the video encoder 100, the residual data samples 122 within one transform unit (TU) are determined by finding the difference between data samples of the input frame data 101 and the prediction 120 of the data samples of the input frame data 101. The difference provides a spatial representation of the transform unit (TU) coefficients. The prediction is provided by an array of data samples known as a prediction unit (PU). Each prediction unit (PU) contains a prediction of the input frame data derived by applying an intra-prediction or an inter-prediction process. Several methods may be used for coding prediction units (PUs) within a coding unit (CU). A single prediction unit (PU) may occupy an entire area of the coding unit (CU), or the coding unit (CU) may be split into two equal-sized rectangular prediction units (PUs), either horizontally or vertically. Additionally, the coding units (CU) may be split into four equal-sized square prediction units (PUs).

As the spatial representation of the transform unit is a two-dimensional array of residual data samples, as described in detail below, a frequency domain representation resulting from the transform is also a two-dimensional array of residual coefficients. The spectral characteristics of a typical transform unit (TU) are such that the frequency domain representation is more compact than the spatial representation. Further, the predominance of lower-frequency spectral information typical in a transform unit (TU) results in a clustering of larger-valued residual coefficients towards the upper-left of the transform unit (TU), where low-frequency residual coefficients are represented.

The residual coefficients of a transform unit (TU) are converted to a two-dimensional significance map of flags in which residual coefficients in the two-dimensional transform unit (TU) having a nonzero magnitude are known as "significant coefficients", and are given a flag value of one. Zero magnitude coefficients in the transform unit (TU) are given a flag value of zero in the significance map. An example of an 8×8 transform unit (TU) 1400 is shown in FIG. 14A where significant coefficient values are seen to congregate in the upper left quadrant. A corresponding significance map 1410 is seen in FIG. 14B where significant coefficient values have been assigned flag values.

The significance map is then scanned in a particular order, known as a scan order, to form a one-dimensional list of flag values, called a list of significant coefficient flags. The scan order may be described or otherwise specified by a scan pattern, such as that received with the prediction mode 142 from the intra-prediction module 109. The scan pattern may be horizontal, vertical, diagonal or zig-zag, either forward or backward. In HEVC reference model version 3.0, the scan operation starts at an upper-left sample of the significance map and progresses until a last significant coefficient is reached (i.e. the last coefficient having a nonzero value). Scan operations having this property and which accord to the HEVC reference model version 3.0 are known as 'forward scans'. In the HEVC reference software version 3.0, the location of the last significant coefficient is signalled by encoding co-ordinates of the coefficient in the transform unit (TU). Those familiar with the art will appreciate that the use of the adjective "last" in this context is dependent upon the particular order of scanning What may be the "last" coefficient or corresponding flag according to one scan pattern may not be the "last" according to another scan pattern. The list of significant coefficient flags, indicating the significance of each residual coefficient prior to the last significant coefficient, is coded into the bitstream. The last significant coefficient flag value is also, but may be separately, encoded into the bitstream.

The clustering of larger-valued residual coefficients towards the upper-left of the transform unit (TU) results in most significance flags earlier in the list being significant, whereas few significance flags are found later in the list.

An alternative scan ordering scheme known in the art as 'backward scan' commences scanning at the position of a last significant coefficient flag and progresses back to the upper-left (root) location within the significance map. A backward scan has the property that residual coefficients at lower list indices tend to have lower magnitudes and fewer significant residual coefficients than residual coefficients at higher list indices.

As described above, the video encoder 100 also comprises an entropy encoder module 104 that implements an entropy encoding method. The entropy encoder module 104 produces syntax elements from incoming residual coefficient data (or residual coefficients) 126 received from the scale and quantise module 103. The entropy encoder module 104 outputs bitstream data 113 and will be described in more detail below. In accordance with the H.264/MPEG-4 AVC video coding standard, the bitstream data 113 is delineated into network abstraction layer (NAL) units. Each slice of a frame is contained in one NAL unit.

There are several alternatives for the entropy encoding method implemented in the entropy encoder module 104.

The alternatives available depend on the particular video coding method being performed by the encoder 100. For example, the high efficiency video coding (HEVC) standard currently under development supports use of low complexity entropy coding (LCEC), a variant of context adaptive variable length coding (CAVLC) in 'low complexity' configurations. The high efficiency video coding (HEVC) standard currently under development also supports binary arithmetic coding (BAC), a variant of context adaptive binary arithmetic coding (CABAC) in 'high efficiency' configurations. For a given video coding method being performed by the encoder 100, one of the supported entropy coding methods is selected according to the configuration of the encoder 100. Further, in encoding the coding units from each frame, the entropy encoder module 104 writes the bitstream data 113 such that each frame has one or more slices per frame, with each slice containing image data for part of the frame. Producing one slice per frame reduces overhead associated with delineating each slice boundary. However, dividing the frame into multiple slices is also possible.

The video decoder 200 may be implemented as one or more software code modules of the software application program 333 resident on the hard disk drive 305 and being controlled in its execution by the processor 305. In particular the video decoder 200 comprises modules 202 to 208 and 210 which may each be implemented as one or more software code modules of the software application program 333. Although the video decoder 200 is described with reference to a high efficiency video coding (HEVC) video decoding pipeline, processing stages performed by the modules 202 to 208 and 209 are common to other video codecs that employ entropy coding, such as H.264/MPEG-4 AVC, MPEG-2 and VC-1.

An encoded bitstream, such as the bitstream 113, is received by the video decoder 200. The encoded bitstream 113 may be read from memory 306, the hard disk drive 310, a CD-ROM, a Blu-ray™ disk or other computer readable storage medium. Alternatively the encoded bitstream 113 may be received from an external source such as a server connected to the communications network 320 or a radio-frequency receiver. The encoded bitstream 113 comprises encoded syntax elements representing frame data to be decoded.

The encoded bitstream 113 is input to an entropy decoder module 202 which extracts the syntax elements from the encoded bitstream 113 and passes the values of the syntax elements to other blocks in the video decoder 200. There may be multiple entropy decoding methods implemented in the entropy decoder module 202. For example, the H.264/MPEG-4 AVC standard supports context adaptive binary arithmetic coding (CABAC) and context adaptive variable length coding (CAVLC) entropy decoding methods. Further, high efficiency video coding (HEVC) supports the low complexity entropy coding (LCEC) and binary arithmetic coding (BAC) entropy decoding methods. Syntax element data 220 representing residual coefficient data is passed to an inverse scale and transform module 203 and syntax element data 222 representing motion vector information is passed to a motion compensation module 204. The inverse scale and transform module 203 performs inverse scaling on the residual coefficient data to create reconstructed transform coefficients. The module 203 then performs an inverse transform to convert the reconstructed transform coefficients from a frequency domain representation to a spatial domain representation, producing residual samples 224. For the H.264/MPEG-4 AVC standard, the inverse transform is desirably a modified inverse discrete cosine transform (IDCT), by which a traditional IDCT is modified by an implementation using only shifts and adds, to reduce complexity.

The motion compensation module 204 uses the motion vector data 222 from entropy decoder module 202, combined with previous frame data 226 from a frame buffer block 208, configured within the memory 306, to produce inter-predicted reference samples 228 for a prediction unit (PU), being a prediction of output decoded frame data. When a syntax element indicates that the current coding unit was coded using intra-prediction, the intra-frame prediction module 205 produces intra-predicted reference samples 230 for the prediction unit (PU) using samples spatially neighbouring the prediction unit (PU). The spatially neighbouring samples are obtained from a sum 232 output from a summation module 210. The multiplexer module 206 selects intra-predicted reference samples or inter-predicted reference samples for the prediction unit (PU) depending on the current prediction mode, which is indicated by a syntax element in the bitstream data 113. The array of samples 234 output from the multiplexer module 206 is added to the residual samples 224 from the inverse scale and transform module 203 by the summation module 210 to produce the sum 232 which is then input to each of a deblocking filter module 207 and the intra-frame prediction module 205. In contrast to the encoder 100, the intra-frame prediction module 205 receives a prediction mode 236 from the entropy decoder 202. The multiplexer 206 receives an intra-frame prediction/inter-frame prediction selection signal from the entropy decoder 202. The deblocking filter module 207 performs filtering along data block boundaries to smooth artefacts visible along the data block boundaries. The output of the deblocking filter module 207 is written to the frame buffer module 208 configured within the memory 306. The frame buffer module 208 provides sufficient storage to hold multiple decoded frames for future reference. Decoded frames 209 are also output from the frame buffer module 208.

In order to decode each significant coefficient flag, a suitable context must be selected within the entropy decoder 202, as will be described below.

Conventional Significance Map Encoding

Figure 4:
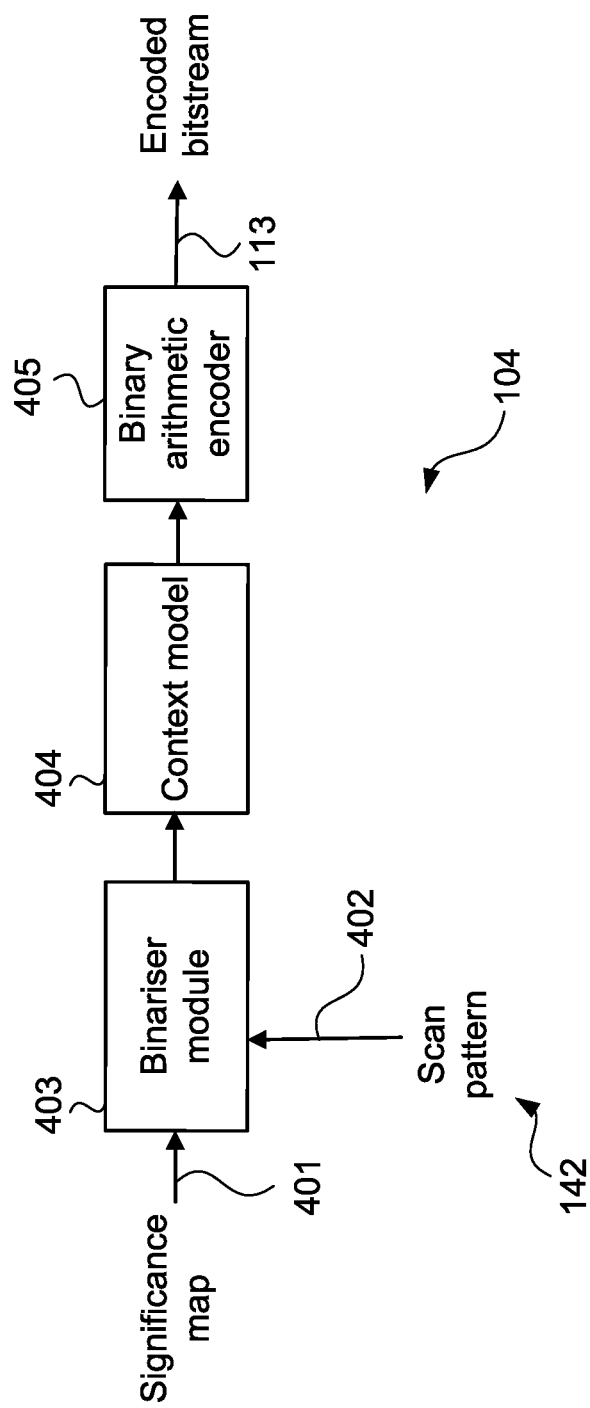
FIG. 4 is a schematic block diagram showing functional modules of an entropy encoder.
Figure 6A:
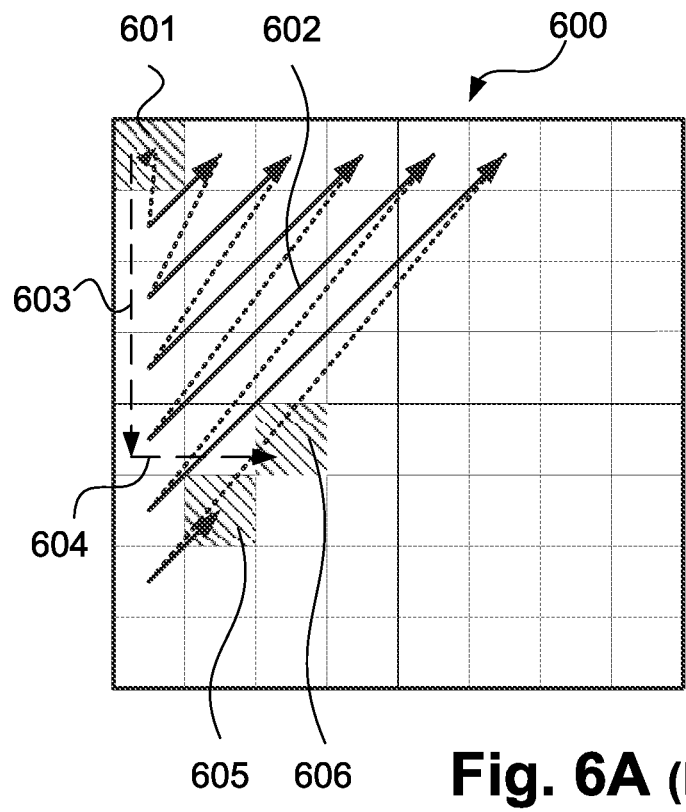
FIG. 6A is a diagram showing a conventional method for scanning a significance map using a forward diagonal up-right scan.

Operation of the entropy encoder 104, when configured for a conventional encoding of a significance map will be described with reference to FIGS. 4, 6A, 7A, 8A and 9A. As seen in FIG. 4, a significance map 401 and a scan pattern 402 are each provided to a binariser module 403, forming part of the entropy encoder 104. FIG. 6A illustrates the scanning of significant coefficient flags in an example significance map 600 using a forward diagonal up-right scan 602 specified by the scan pattern 402, according to HEVC reference model version 3.0. The significance map 600 includes flags corresponding to those shown in FIG. 14B, but where only a flag 601 at the root location (0,0), the last significance flag 606 and the second-last flag 605, are indicated by diagonal hatching of cells of the significance map 600, the others being omitted for the sake of clarity. The arrowed solid lines along the forward diagonal up-right scan 602 indicate the path taken in scanning significant coefficient flags in the significance map 600. The dotted lines along the forward diagonal up-right scan 602 indicate significant coefficient flags which are sequential in the scan order but spatially result in non-contiguous jumps in the locations of significant coefficient flags in significance map 600.

The residual coefficients 126 in the transform unit (TU) are provided by the scale and quantise block 103 as a two-dimensional array. The significance map 401 describes the residual coefficients in the transform unit (TU). The significance map 401 contains an array of significant coefficient flags. Each significant coefficient flag corresponds to one residual coefficient in the transform unit (TU). A residual coefficient with a value of zero ("zero-valued") has a corresponding zero-valued significant coefficient flag in the significance map 401. A nonzero-valued residual coefficient has a significant coefficient flag with a value of one ("one-valued") in the significance map 401. In order to encode the residual coefficients in the transform unit (TU), the significance map 401 is encoded in the bitstream data 113.

As seen in the example of FIG. 6A, the location of a last significant coefficient flag 606 is indicated using two indices, a last_significant_y index 603 and a last_significant_x index 604, in this case being a coordinate (2,4) relative to the root (0,0) at 601. The binariser module 403 binarises the last_significant_y index 603 and the last_significant_x index 604 creating relationships between each binarised value and a corresponding context value obtained from a context model 404. The significant coefficient flags in the significance map 600 are scanned by applying the forward diagonal up-right scan 602, which starts, in this example, at the root location of the significant coefficient flag 601 and ends at the penultimate (second-last) significant coefficient flag 605. Each scanned significant coefficient flag along the forward diagonal up-right scan 602 is binarised in the binariser module 403. The last significant coefficient flag 606 is not scanned as this flag is already known to be significant.

Figure 7A:
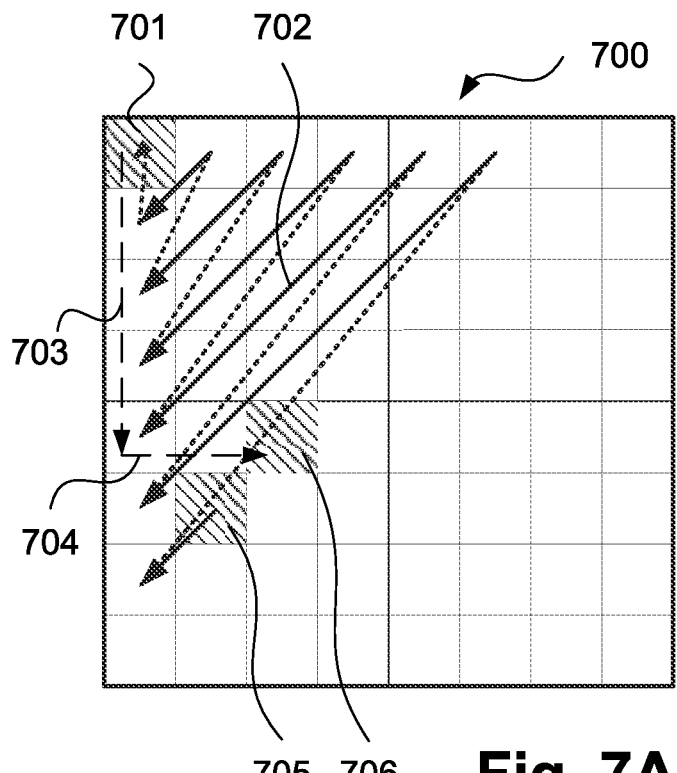
FIG. 7A is a diagram showing a conventional method for scanning a significance map using a backward diagonal down-left scan.

FIG. 7A illustrates how significant coefficient flags can be scanned in an example significance map 700, using a backward diagonal down-left scan 702 for the scan pattern 402. Again, the location of a last significant coefficient flag 706 is indicated using two indices, a last_significant_y index 703 and a last_significant_x index 704. A binariser module 403 binarises the last_significant_y index 703 and the last_significant_x index 704 creating relationships between each binarised value and a corresponding context value, obtained from a context model 404. The significant coefficient flags in the significance map 700 are scanned by applying the backward diagonal down-left scan 702, which starts in this case at a significant coefficient flag 705 (being the penultimate flag 605 of FIG. 6A) and ends at a significant coefficient flag 701 (being the root location of FIG. 6A). Each scanned significant coefficient flag along the backward diagonal down-left scan 702 is binarised in the binariser module 403. The last significant coefficient flag 706, which in this case establishes the start location for the scan order, is not scanned as this flag is already known to be one-valued.

Figure 8A:
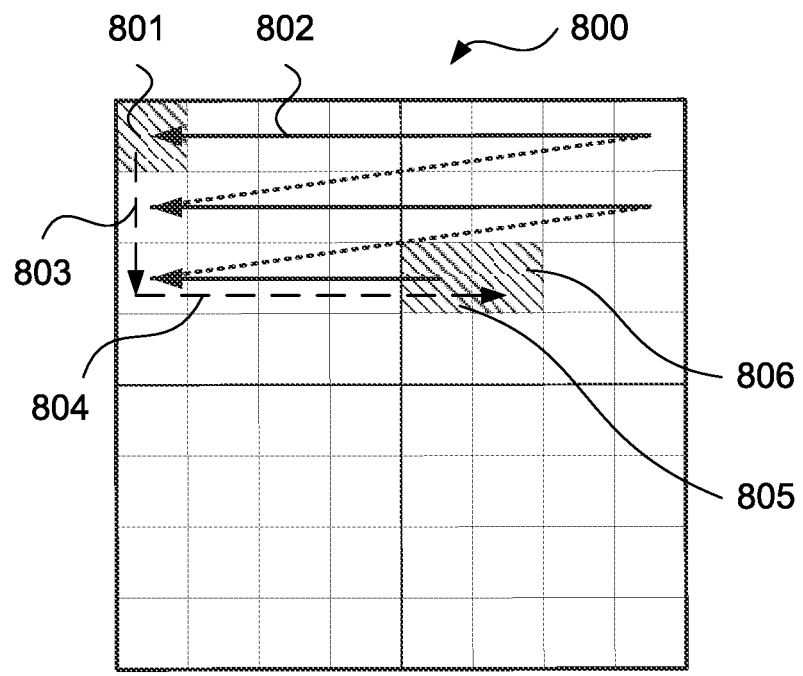
FIG. 8A is a diagram showing a conventional method for scanning a significance map using a backward horizontal scan.

FIG. 8A illustrates how significant coefficient flags in an example significance map 800 can be scanned using a backward horizontal scan 802 for the scan pattern 402. In this example, a different arrangement of significant flags is used to better illustrate the scan 802. The location of a last significant coefficient flag 806 is indicated using two indices, a last_significant_y index 803 and a last_significant_x index 804. A binariser module 403 binarises the last_significant_y index 803 and the last_significant_x index 804 creating relationships between each binarised value and a corresponding context value, obtained from a context model 404. The significant coefficient flags in the significance map 800 are scanned by applying the backward horizontal scan 802, which starts at a significant coefficient flag 805 and ends at a significant coefficient flag 801. Each scanned significant coefficient flag along the backward horizontal scan 802 is binarised in the binariser module 403. Again, the last significant coefficient flag 806 is not scanned as this flag is already known to be one-valued.

Figure 9A:
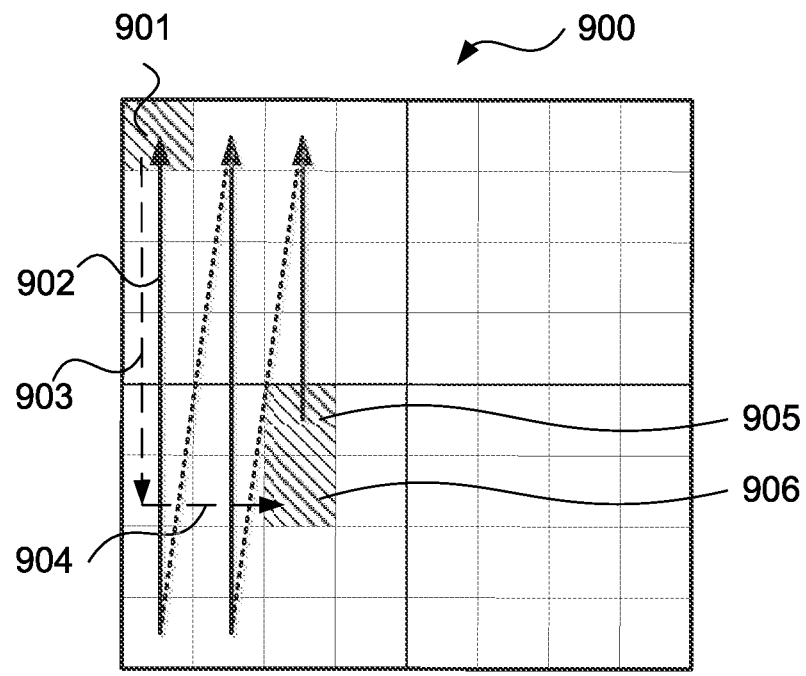
FIG. 9A is a diagram showing a conventional method for scanning a significance map using a backward vertical scan.

FIG. 9A illustrates how significant coefficient flags can be scanned in an example significance map 900 using a backward vertical scan 902 for the scan pattern 402. The location of a last significant coefficient flag 906 is again indicated using two indices, a last_significant_y index 903 and a last_significant_x index 904. A binariser module 403 binarises the last_significant_y index 903 and the last_significant_x index 904 creating relationships between each binarised value and a corresponding context value, obtained from a context model 404. The significant coefficient flags in the significance map 900 are scanned by applying the backward vertical scan 902, which starts at a significant coefficient flag 905 and ends at a significant coefficient flag 901. Each scanned significant coefficient flag along the backward vertical scan 902 is binarised in the binariser module 403. The last significant coefficient flag 906 is again not scanned as this flag is already known to be one-valued.

The scanning, irrespective of the scan pattern used, produces a one-dimensional list of the flags up to the last significant coefficient flag. An example of this is seen in FIG. 14C where a list 1420 is shown for the significance map 1410 of FIG. 14B and for the forward diagonal up-right scan pattern 602 of FIG. 6A. Note that the list 1420 includes 23 entries corresponding to the flags along the scan 602 up to and including the penultimate flag 605. The list 1420 also shows a representation (2,4) of the last_significant_y index 603 and the last_significant_x index 604 which is also encoded, but not necessarily as part of the list 1420.

Returning to FIG. 4, after scanning of the significance map 401, the individual flag values from the one-dimensional list are encoded in a binary arithmetic encoder 405 using the corresponding contexts obtained from the context model 404, to form the encoded bitstream 113.

Whilst FIG. 4 and the scanning and binarising of FIGS. 6A, 7A, 8A and 9A have all been described as operating on the significance map 401 (1410), it will be appreciated that the transform unit (TU) 1400 may be input to the binariser module 403, the operation of which according to the scan pattern 402 results in the production of the one-dimensional list of significance flags 1420, thereby obviating a need to separately form and/or store the significance map 1410.

Conventional Significance Map Decoding

Operation of the entropy decoder 202, when configured for a conventional decoding of a significance map 505 will be described with reference to FIGS. 5, 6A, 7A, 8A and 9A. FIG. 6A illustrates scanning of significant coefficient flags in an example significance map 600 using the forward diagonal up-right scan 602 as a scan pattern 504. The encoded bitstream 113 is input to a binary arithmetic decoder 501 which produces a decoded bin 512 using a context 510 provided by a context model 502. An inverse binariser 503 outputs syntax elements, such as a significance map 505, by decoding sequences of decoded bins 512 from the binary arithmetic decoder 501. The context 510 is selected using a context index 511, provided by the inverse binariser 503. The context 510 is updated using the decoded bin 512 and the inverse binariser 503 receives the decoded bin 512. An inverse binariser 503 decodes the last_significant_y index 603 and the last_significant_x index 604. The last_significant_y index 603 and the last_significant_x index 604 specify the location of the last significant coefficient flag 606. This is the location of the last residual coefficient, when the forward diagonal up-right scan 602 is applied to the transform unit (TU), that is significant. The decoded bin is used by the inverse binariser 503 to determine the value of one significant coefficient flag. The inverse binariser 503 decodes significant coefficient flags by scanning the transform unit (TU) using the forward diagonal up-right scan 602, as specified by the scan pattern 504. The scan begins at a significant coefficient flag 601 and ends at a significant coefficient flag 605. The last significant coefficient flag 606 is already known to be significant and therefore need not be scanned. The decoded significant coefficient flags are output as the significance map 505.

FIG. 7A illustrates the scanning of significant coefficient flags in an example significance map 700 using the backward diagonal down-left scan 702 as the scan pattern 504. The encoded bitstream 113 is input to the binary arithmetic decoder 501 which decodes bins using a context provided by the context model 502. The inverse binariser 503 decodes the last_significant_y index 703 and the last_significant_x index 704 specifying the location of the last significant coefficient flag 706. The inverse binariser 503 decodes significant coefficient flags by scanning the significance map 700 using a backward diagonal down-left scan 702, as specified by the scan pattern 504. The scan begins at a significant coefficient flag 705 and ends at a significant coefficient flag 701. The last significant coefficient flag 706 is already known to be significant and therefore is not scanned. The decoded significant coefficient flags are output as the significance map 505.

FIG. 8A illustrates the scanning of significant coefficient flags in an example significance map 800 using the backward horizontal scan 802. The encoded bitstream 113 is input to the binary arithmetic decoder 501 which decodes bins using a context provided by the context model 502. The inverse binariser 503 decodes the last_significant_y index 803 and the last_significant_x index 804 being the location of the last significant coefficient flag 806. This is the location of the last residual coefficient, when the backward horizontal scan 802 is applied to the significance map 800, that is significant.

The decoded bin is used by the inverse binariser 503 to determine the value of one significant coefficient flag. The inverse binariser 503 decodes significant coefficient flags by scanning the significance map 800 using a backward horizontal scan 802, as specified by the scan pattern 504. The scan begins at a significant coefficient flag 805 and ends at a significant coefficient flag 801. The last significant coefficient flag 806 is already known to be significant and therefore is not scanned. The decoded significant coefficient flags are output as the significance map 505.

FIG. 9A illustrates the scanning of significant coefficient flags in an example significance map 900 using the backward vertical scan 902. The encoded bitstream 113 is input to the binary arithmetic decoder 501 which decodes bins using a context provided by the context model 502. The inverse binariser 503 decodes the last_significant_y index 903 and the last_significant_x index 904 specifying the location of the last significant coefficient flag 906. This is the location of the last residual coefficient, when the backward vertical scan 902 is applied to the significance map 900, that is significant. The decoded bin is used by the inverse binariser 503 to determine the value of one significant coefficient flag. The inverse binariser 503 decodes significant coefficient flags by scanning the significance map 900 using a backward vertical scan 902, as specified by the scan pattern 504. The scan begins at a significant coefficient flag 905 and ends at a significant coefficient flag 901. The last significant coefficient flag 906 is already known to be significant and therefore is not scanned. The decoded significant coefficient flags are output as the significance map 505.

Significance Map Encoding with Sets of Flags

Figure 12:
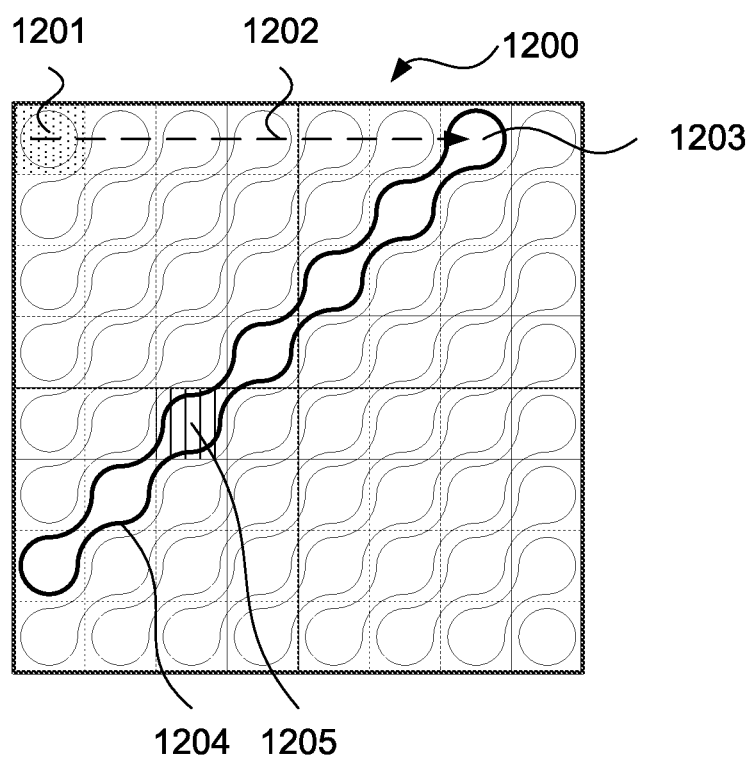
FIG. 12 is a diagram showing an allocation of significant coefficient flags within a transform unit (TU) into multiple sets, with each set containing significant coefficient flags consecutively located along the diagonal up-right scan and set boundaries aligned to the transform unit (TU) boundary.

The concept of sets of significant coefficient flags according to the present disclosure will be described with reference to FIGS. 6 and 12. In FIG. 12, one arrangement of grouping together the significant coefficient flags of a significance map 1200 into one or more sets is presented. The grouping of FIG. 12 is composed such that significant coefficient flags along the forward diagonal up-right scan (i.e. 602 of FIG. 6A) are arranged into discrete groups or sets. All the boundaries between sets occur at, or are coincident with, a boundary of the significance map 1200 or corresponding transform unit (TU). An example set 1204 is indicated by thicker lines and contains seven significant coefficient flags, including in this example a last significant coefficient flag 1205, collocated with the last significant coefficient flag 606. The example set 1204 is referenced by a set index 1202. In this example, the set index 1202 is the value of (x+y) of the last member of the set, giving each set a unique index. Thus, for example the set index 1202 is (6+0=6), assuming a root location 1201 has coordinates (0,0). The set index is therefore established using the scan pattern which in turn establishes the groups or sets. When scanning significant coefficient flags within the significance map 401 using the forward diagonal up-right scan 602, the set index 1202 indicates that the scan terminates at a significant coefficient flag 1203. In this example, the range of scan indices is from 0 to 14, which would permit uniquely identifying each of the illustrated diagonal sets.

Where the scan pattern is horizontal or vertical, the sets would also be horizontal or vertical respectively, whilst the scan index range for the illustrated significance map 1200 would be 0 to 7 for either scan pattern, for a transform unit (TU) size of 8×8. Differently sized transform units (TUs) would have correspondingly different ranges of scan index.

Figure 13:
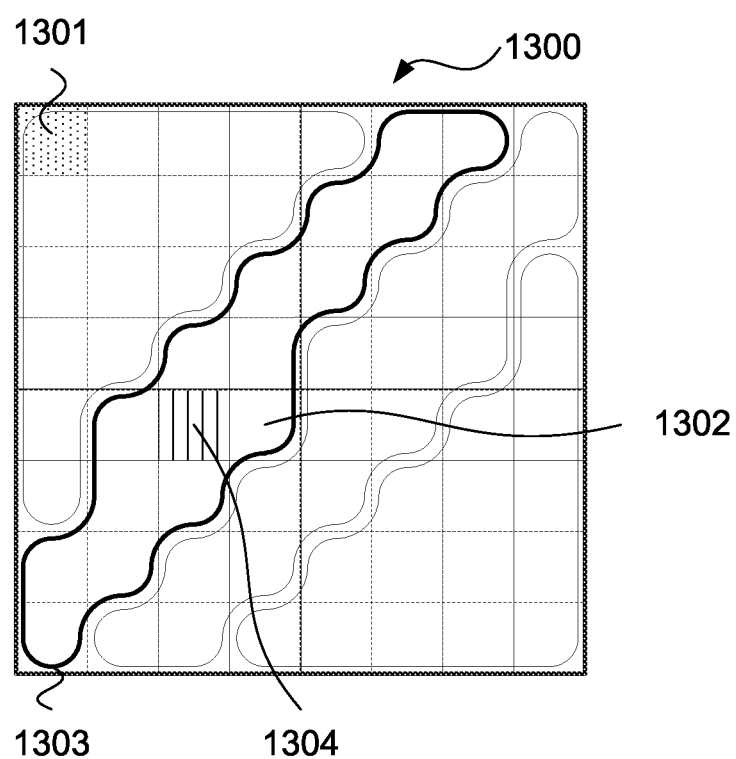
FIG. 13 is a diagram showing an allocation of significant coefficient flags within a transform unit (TU) into multiple sets, each set having equal size.

An alternative implementation of groups or sets of significant coefficient flags will now be described with reference to FIGS. 6 and 13. In this alternative implementation, the set boundary is no longer restricted to adjacent locations along a scan line of a transform unit (TU) 1300. Instead, each of the sets in a transform unit (TU) are comprised of an equal number of significant coefficient flags. An example set 1303 contains 16 significant coefficient flags, including a last significant coefficient flag 1304. A set index 1302 uniquely identifies this set. When the significance map is scanned, all significant coefficient flags within the example set 1303 are scanned. In this example the set index would have a possible range of 0 to 3, permitting simple encoding. In this example each set consists of a specific number of significant coefficient flags, grouped consecutively along a forward or backward diagonal scan along a transform unit (TU). Each set therefore is formed by locations from at least two scan lines of the transform unit (TU) 1300.

Operation of the entropy encoder 104 when configured to implement a method 1000 of encoding a significance map 401 according to the present disclosure, will be described with reference to FIGS. 4, 6B, 7B, 8B, 9B and 10. FIG. 10 illustrates the steps of the encoding method 1000 which may be embodied in software stored on the HDD 310 and executable by the processor 305 in concert with the memory 306. In a determine scan direction step 1001, the binariser module 403 receives a scan pattern 402 indicating that significant coefficient flags are to be scanned in a transform unit (TU) using a forward diagonal up-right scan 609 of FIG. 6B of the corresponding significance map 607. The residual coefficients in the transform unit (TU) are provided by the scale and quantise block 103 as a two-dimensional array. In order to encode the residual coefficients in the transform unit (TU), the corresponding significance map 401 is encoded in the bitstream data 113. In a determine last significant coefficient location step 1002, the binariser module 403 determines the location of a last significant coefficient 612 by scanning residual coefficients in the transform unit (TU) until the last nonzero residual coefficient is found. In a select predetermined set step 1003, the binariser module 403 selects a set index 610 (in this case having a value of 6) indicating which set of significant coefficient flags contains the last significant coefficient flag 612. In a store set index step 1004, the binariser module 403 binarises the set index 610 using contexts obtained from the context model 404. The significant coefficient flags in the significance map 607 are scanned by applying the forward diagonal up-right scan 609, which starts at a significant coefficient flag 608 and proceeds to end at a significant coefficient flag 613. Each scanned significant coefficient flag along the forward diagonal up-right scan 609 up to and including the entirety of the last set, in this case defined by the flag 613, is binarised in the binariser module 403.

FIG. 14D depicts a one-dimensional list of flag values formed according to the present disclosure for the example of FIGS. 6A, 14A and 14B to be encoded with the set index value of 6. FIG. 14D shows 27 flag values plus the set index value.

For a scan pattern along horizontal rows, the terminal set to be encoded will be that row including the last significant coefficient flag. For a scan pattern along vertical columns, the terminal set to be encoded will be that column in which the last significant coefficient flag is found.

Figure 7B:
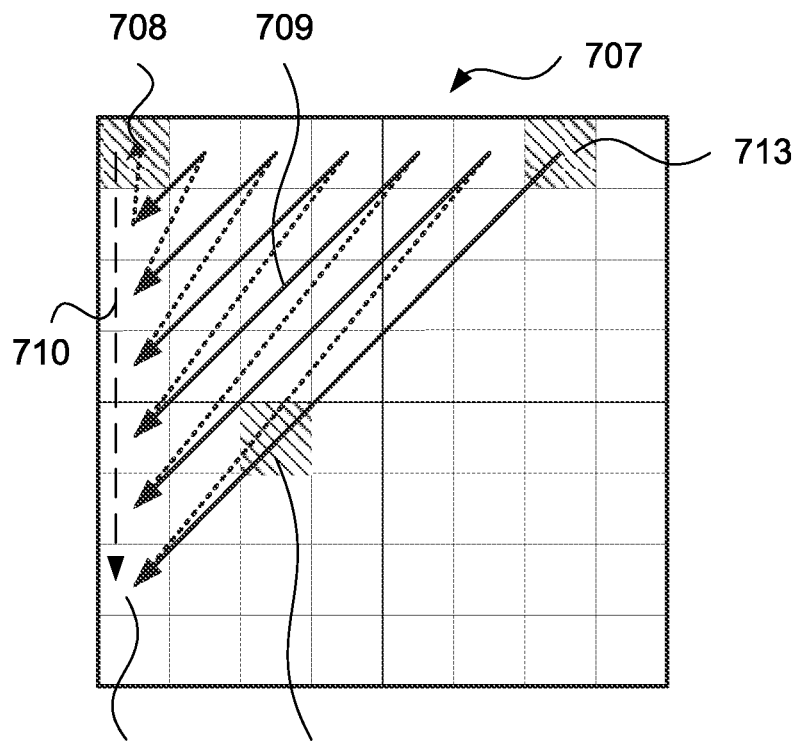
FIG. 7B is a diagram showing a method according to the present disclosure for scanning a significance map using a backward diagonal down-left scan.

In FIG. 7B, in the determine scan direction step 1001, the binariser module 403 receives a scan pattern 402 indicating that significant coefficient flags are to be scanned in a significance map 707 using a backward diagonal down-left scan 709. The residual coefficients in the transform unit (TU) are provided by the scale and quantise block 103 as a two-dimensional array. In order to encode the residual coefficients in the transform unit (TU) the corresponding significance map 707 is encoded in the bitstream data 113. In the determine last significant coefficient location step 1002, the binariser module 403 determines the location of a last significant coefficient 712 by scanning residual coefficients in the transform unit (TU) until the last nonzero residual coefficient is found. In the select predetermined set step 1003, the binariser module 403 selects a set index 710 indicating which set contains the last significant coefficient flag 712. In the store set index step 1004, the binariser module 403 binarises the set index 710 using contexts, obtained from a context model 404. The significant coefficient flags in the significance map 707 are scanned by applying the backward diagonal down-left scan 709, which starts at a significant coefficient flag 713 and proceeds to end at a significant coefficient flag 708. Each scanned significant coefficient flag along the backward diagonal down-left scan 709 is binarised in the binariser module 403.

Figure 8B:
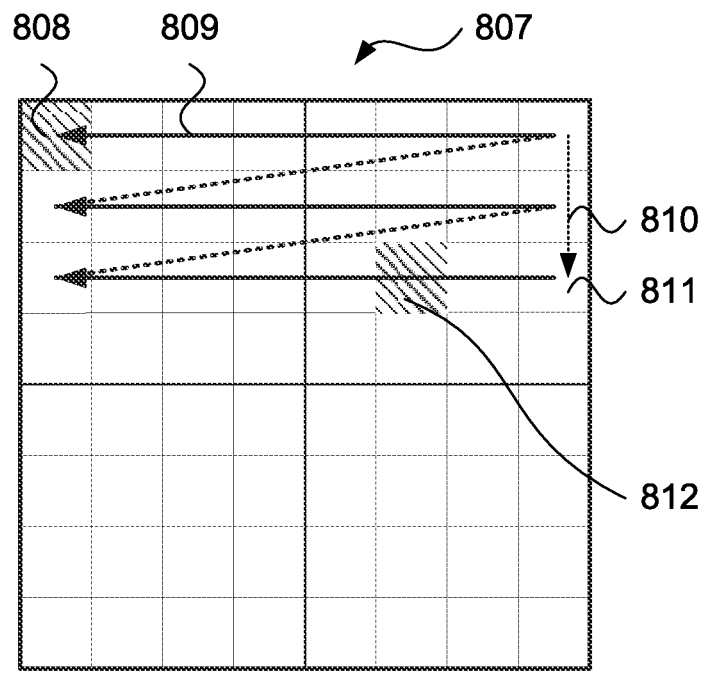
FIG. 8B is a diagram showing a method according to the present disclosure for scanning a significance map using a backward horizontal scan.

In FIG. 8B, in the determine scan direction step 1001, the binariser module 403 receives a scan pattern 402 indicating that significant coefficient flags shall are to be scanned in a significance map 807 using a backward horizontal scan 809. The residual coefficients in the transform unit (TU) are provided by the scale and quantise block 103 as a two-dimensional array. In order to encode the residual coefficients in the corresponding transform unit (TU) the significance map 807 is encoded in the bitstream data 113. In the determine last significant coefficient location step 1002, the binariser module 403 determines the location of a last significant coefficient 812 by scanning residual coefficients in the transform unit (TU) until the last nonzero residual coefficient is found. In the select predetermined set step 1003, the binariser module 403 selects a set index 810 indicating which set contains the last significant coefficient flag 812. In the store set index step 1004, the binariser module 403 binarises the set index 810 (having a value of 2) using contexts obtained from a context model 404. The significant coefficient flags in the significance map 807 are scanned by applying the backward horizontal scan 809, which starts at a significant coefficient flag 811 (being the end of the row that includes the last significant coefficient flag 812) and ends at a significant coefficient flag 808. Each scanned significant coefficient flag along the backward horizontal scan 809 is binarised in the binariser module 403.

Figure 9B:
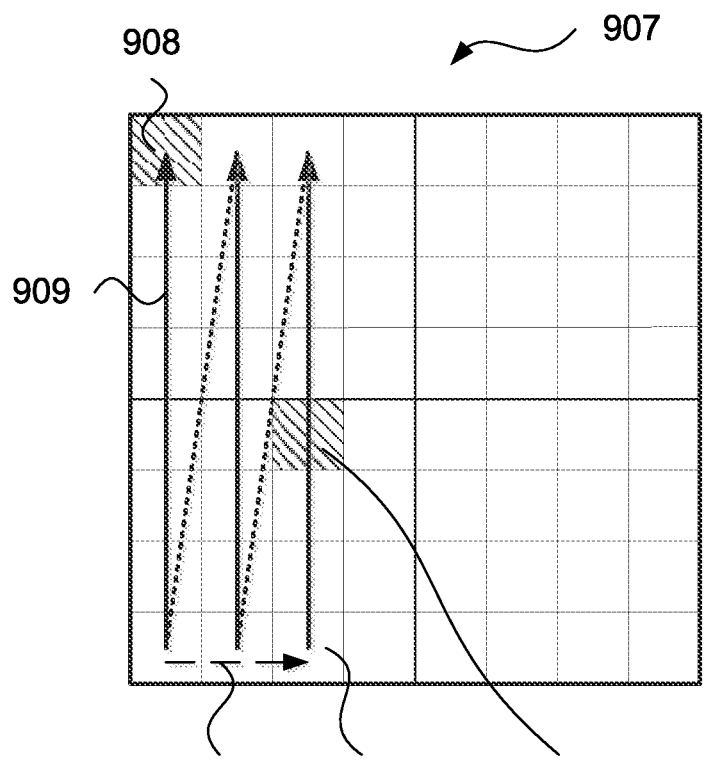
FIG. 9B is a diagram showing a method according to the present disclosure for scanning a significance map using a backward vertical scan.

In FIG. 9B, in the determine scan direction step 1001, the binariser module 403 receives a scan pattern 402 indicating that significant coefficient flags are to be scanned in a significance map 907 using a backward vertical scan 909. In order to encode the residual coefficients in the corresponding transform unit (TU) the significance map 907 is encoded in the bitstream data 113. In the determine last significant coefficient location step 1002, the binariser module 403 determines the location of a last significant coefficient 912 by scanning residual coefficients in the transform unit (TU) until the last nonzero residual coefficient is found. In the select predetermined set step 1003, the binariser module 403 selects a set index 910 indicating which set contains the last significant coefficient flag 912. In the store set index step 1004, the binariser module 403 binarises the set index 910 (in this example, again the value of 2) using contexts obtained from a context model 404. The significant coefficient flags in the significance map 907 are scanned by applying the backward vertical scan 909, which starts at a significant coefficient flag 911 (being the end of the terminal column including the flag 912) and ends at a significant coefficient flag 908. Each scanned significant coefficient flag along the backward vertical scan 909 is binarised in the binariser module 403.

Significance Map Decoding with Sets of Flags

Figure 6B:
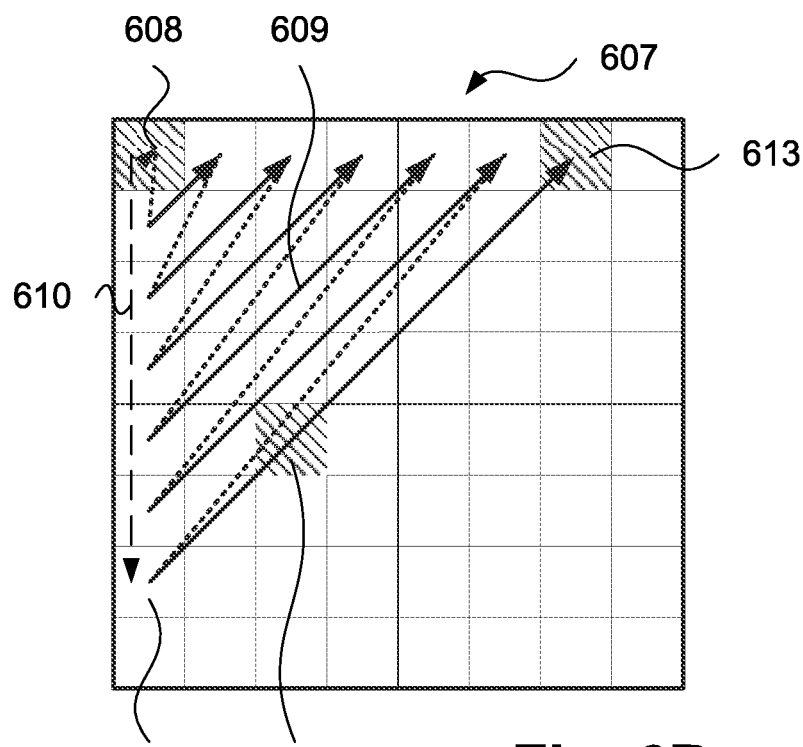
FIG. 6B is a diagram showing a method according to the present disclosure for scanning a significance map using a forward diagonal up-right scan.

Operation of the entropy decoder 202 when configured to implement a method 1100 of decoding the significance map 505 will be described with reference to FIGS. 5, 6B, 7B, 8B, 9B and 11. FIG. 11 illustrates the steps of the decoding method 1100 which for example may be embodied in software stored on the HDD 310 and executable by the processor 305 in concert with the memory 306. In FIG. 6B, in a determine scan direction step 1101, the inverse binariser module 503 receives the scan pattern 504 indicating that significant coefficient flags are to be scanned in the transform unit (TU) corresponding to the significance map 607 using the forward diagonal up-right scan 609. The encoded bitstream 113 is input to the binary arithmetic decoder 501 which decodes bins using a context provided by a context model 502. In a receive set index step 1102 the inverse binariser 503 decodes the set index 610. The set index 610 indicates which set contains the last significant coefficient flag 612. In a determine location in transform unit (TU) step 1103, the inverse binariser 503 determines the location of the significant coefficient flag 613, which is located in the last line of the set along the scan pattern 504. The decoded bin is used by the inverse binariser 503 to determine the value of one significant coefficient flag. In a decode significant coefficient flags step 1104, the inverse binariser 503 decodes significant coefficient flags by scanning the significance map 607 using a forward diagonal up-right scan 609, as specified by the scan pattern 504. The scan begins at a significant coefficient flag 608 and ends at the significant coefficient flag 613. The decoded significant coefficient flags are output as the significance map 505.

In FIG. 7B, in the determine scan direction step 1101 the inverse binariser module 503 receives the scan pattern 504 indicating that significant coefficient flags are to be scanned in the transform unit (TU) corresponding to the significance map 707 using the backward diagonal down-left scan 709. The encoded bitstream 113 is input to the binary arithmetic decoder 501 which decodes bins using a context provided by a context model 502. In the receive set index step 1102 the inverse binariser 503 decodes the set index 710. The set index 710 indicates which set contains the last significant coefficient flag 712. In the determine location in transform unit (TU) step 1103, the inverse binariser 503 determines the location of the significant coefficient flag 713, which is located at the end of the last line of the set along the scan pattern 504. The decoded bin is used by the inverse binariser 503 to determine the value of one significant coefficient flag. In the decode significant coefficient flags step 1104 the inverse binariser 503 decodes significant coefficient flags by scanning the significance map 707 using a backward diagonal down-left scan 709, as specified by the scan pattern 504. The scan begins at a significant coefficient flag 708 and ends at the significant coefficient flag 713. The decoded significant coefficient flags are output as the significance map 505.

In the example of FIG. 8B, in the determine scan direction step 1101 the inverse binariser module 503 receives the scan pattern 504 indicating that significant coefficient flags are to be scanned in the transform unit (TU) corresponding to the significance map 807 using the backward horizontal scan 809. The encoded bitstream 113 is input to the binary arithmetic decoder 501 which decodes bins using a context provided by a context model 502. In the receive set index step 1102 the inverse binariser 503 decodes the set index 810. The set index 810 indicates which set contains the last significant coefficient flag 812, in this cases the third row, corresponding to the set index value of 2. In the determine location in transform unit (TU) step 1103, the inverse binariser 503 determines the location of the significant coefficient flag 811 located last in the third row along the scan pattern 504. The decoded bin is used by the inverse binariser 503 to determine the value of one significant coefficient flag. In the decode significant coefficient flags step 1104 the inverse binariser 503 decodes significant coefficient flags by scanning the significance map 807 using a backward horizontal scan 809, as specified by the scan pattern 504. The scan begins at a significant coefficient flag 811 and ends at the significant coefficient flag 808. The decoded significant coefficient flags are output as the significance map 505.

In FIG. 9B, in the determine scan direction step 1101, the inverse binariser module 503 receives the scan pattern 504 indicating that significant coefficient flags are to be scanned in the transform unit (TU) corresponding to a significance map 907 using the backward vertical scan 909. The encoded bitstream 113 is input to the binary arithmetic decoder 501 which decodes bins using a context provided by a context model 502. In the receive set index step 1102 the inverse binariser 503 decodes the set index 910. The set index 910 indicates which set contains the last significant coefficient flag 912, in this case the third column In the determine location in transform unit (TU) step 1103, the inverse binariser 503 determines the location of the significant coefficient flag 911, which is located last in the third row along the scan pattern 504. The decoded bin is used by the inverse binariser 503 to determine the value of one significant coefficient flag. In the decode significant coefficient flags step 1104 the inverse binariser 503 decodes significant coefficient flags by scanning the significance map 907 using a backward vertical scan 909, as specified by the scan pattern 504. The scan begins at a significant coefficient flag 911 and ends at the significant coefficient flag 908. The decoded significant coefficient flags are output as the significance map 505.

Figure 15:
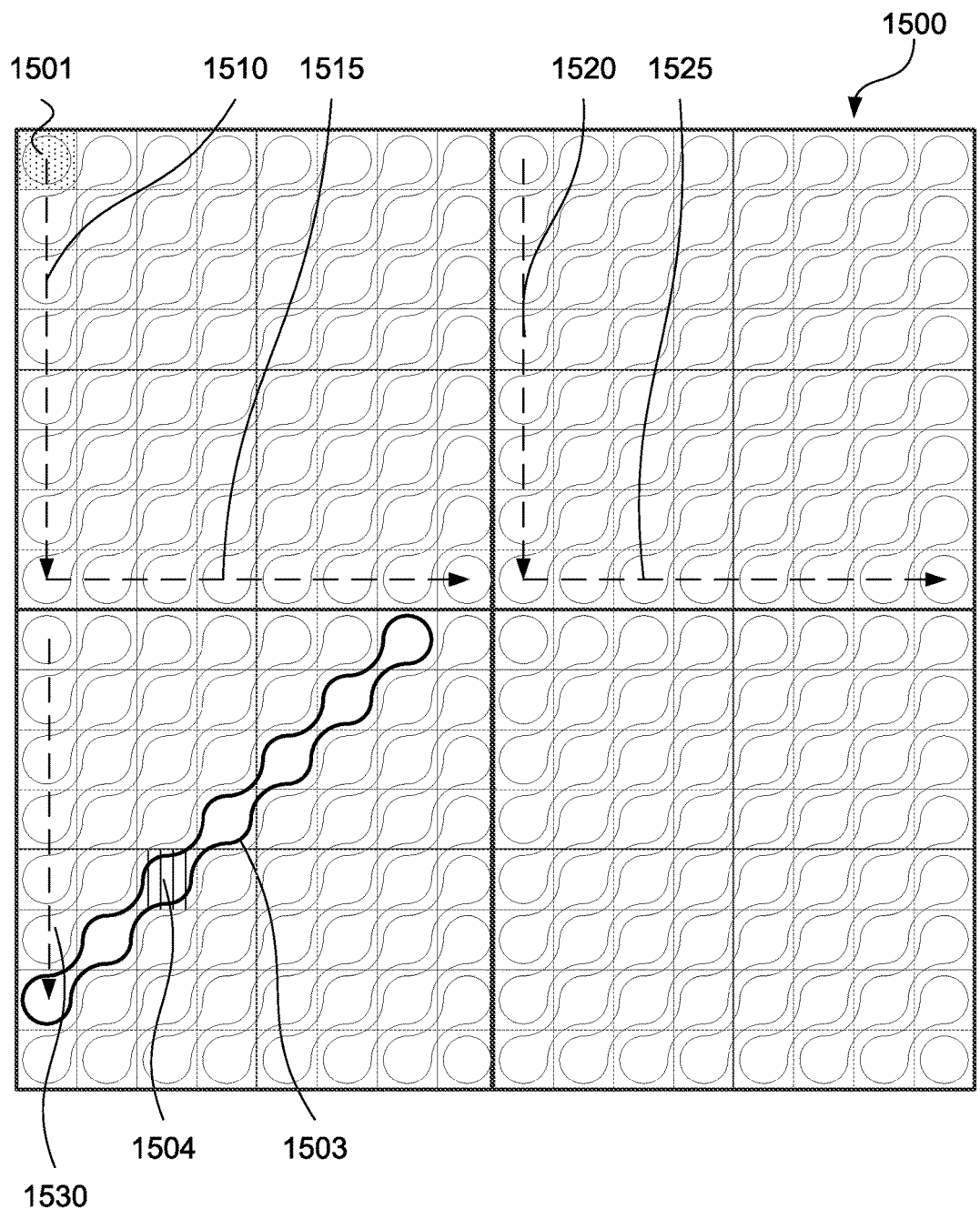
FIG. 15 is a diagram showing an allocation of significant coefficient flags within a transform unit (TU) into multiple sets.

A further alternative implementation of sets of significant coefficient flags will be described with reference to FIG. 15. In the further alternative implementation, a significance map 1500 having a width and height of 16 is depicted. The significance map 1500 is subdivided into four 8×8 sub-blocks. The set, or group, boundaries occur at the 8×8 sub-block boundaries. The composition of each set is such that none of the sets extend across the 8×8 sub-block boundaries in the significance map 1500. A set index is determined to select an example set 1503 containing a last significant coefficient 1504. Each sub-block in the significance map 1500 contains 15 unique sets. Counting sub-blocks in raster scan order (from zero) places the set 1503 in the third sub-block of the significance map 1500, having a sub-block index of 2. An index 1530 within the third sub-block has a value of 6, selecting the set 1503. The set index for the significance map 1500 is therefore indexes 1510, 1520 and 1530 which is 2*15+6=36. Such an arrangement of set boundaries has the advantageous property for software implementations that during encoding or decoding, the significance map may be divided into sub-blocks and the sets within each sub-block may be processed separately, resulting in a reduced quantity of data required to be held in the intermediate variables 358. The remainder of the significance map may be held in data 332, which in contemporary semiconductor technology typically has a higher access latency as the data 332 is located off-chip. Hardware implementations utilising a combination of on-chip and off-chip storage for intermediate variables 358 and data 332 realise a similar advantage when the significance map 1500 is divided into multiple sub-blocks to facilitate processing. In this further alternative implementation, the selected scan is applied to the entirety of the significance map 1500, regardless of the size of the significance map 1500 or the sub-block size. This is in contrast to existing schemes whereby each sub-block of the significance map 1500 has the scan pattern applied locally.

Another alternative implementation of decoding the significance map in the entropy decoder 202 will be described in relation to FIGS. 5, 16 and 17. In a method 1700 for decoding the significance map 1610, in a decode set flags step 1701, the inverse binariser module 503 of FIG. 5 decodes one set flag for each set in a significance map 1610. During encoding, but not illustrated, the significance map 1610 uses a horizontal scan pattern to produce set flags 1620. The set flags comprise individual bits, one bit determined for each scan line of the significance map 1610. Each bit in the set flags is determined by performing a logical "or" operation for significant coefficient flags within the corresponding set, or each scan line in the horizontal scan pattern case. The presence of ones in the second row of the significance map 1610 will set the set flag 1630 to one. The fourth row of the significance map 1610 contains only zeros so the corresponding set flag 1635 is set to zero. Decoding a zero-value for a given set flag indicates that all of the significant coefficient flags for the corresponding set are zero-valued. Decoding a one-value for a set flag indicates that one or more of the significant coefficient flags contained in the corresponding set have a value of one.

In a decode significant coefficient flags step 1702, the inverse binariser module 503 decodes significant coefficient flags only for those sets with at least one one-valued significant coefficient flag. If the inverse binariser module 503 reaches the ultimate significant coefficient flag within a set containing one or more one-valued significant coefficient flag and has not yet encountered any one-valued significant coefficient flags within the set, the value of the ultimate significant coefficient flag within the set may be inferred as one-valued and the inverse binariser module 503 is not required to decode the ultimate significant coefficient flag. After the decode significant coefficient flags step 1702 completes, the method 1700 terminates.

An alternative implementation of the set flag method of FIG. 16 will be described with reference to FIGS. 16 and 18. In a method 1800, a decode set flag step 1801 decodes a single set flag, such as one set flag of the set flags 1620. A test set flag step 1802 tests the value of the set flag and if one-valued, the method 1800 proceeds to a decode significant coefficient flags in set step 1803, otherwise control proceeds to a last set test step 1804. The decode significant coefficient flags in set step 1803 decodes only significant coefficient flags in the correspondingly enabled set. The last set test step 1804 returns control to the decode set flag step 1801 until the last set in the significance map 1610 has been reached, at which point the method 1800 terminates.

Figure 16:
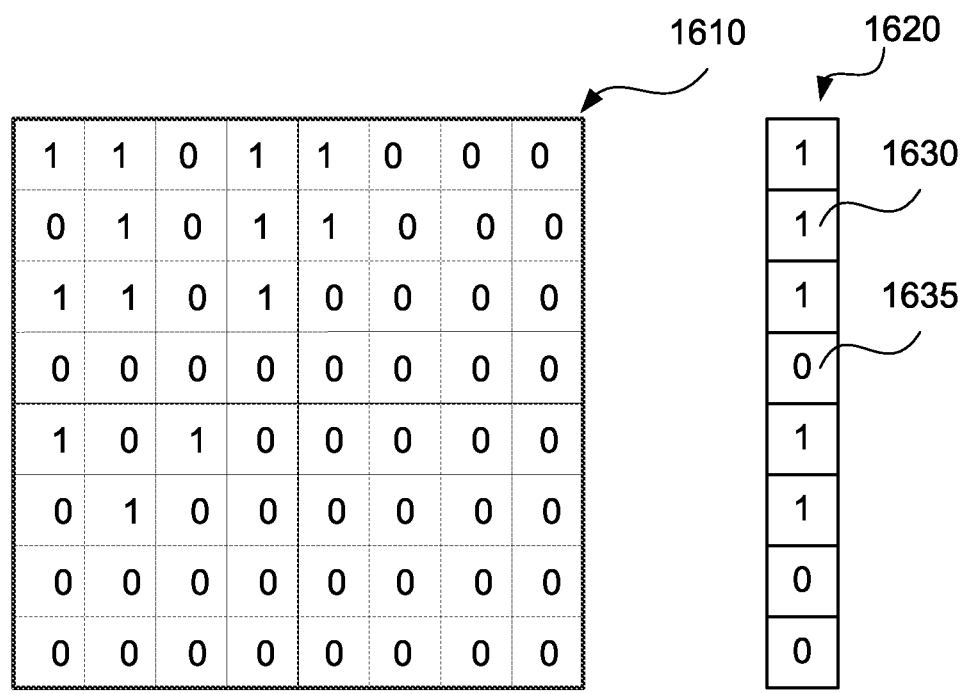
FIG. 16 is a diagram showing a significance map with a corresponding set index.
Figure 17:
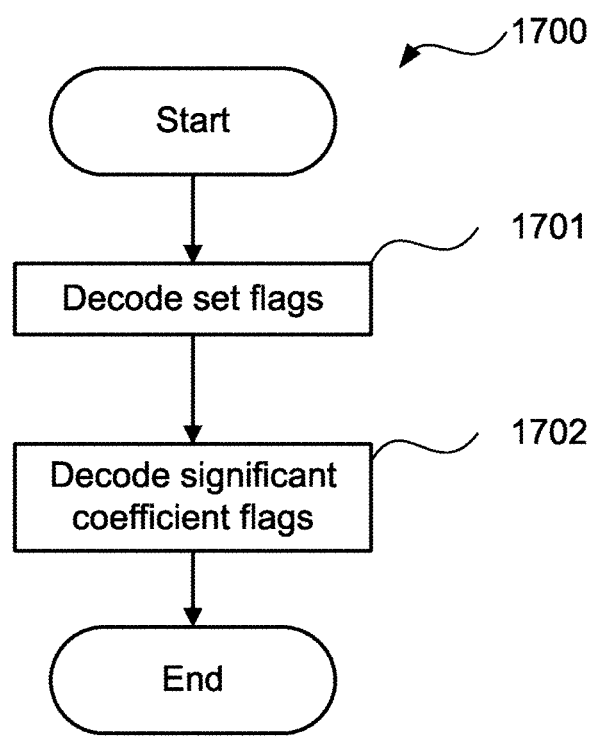
FIG. 17 is a flowchart of a method for decoding the significance map of FIG. 16.
Figure 18:
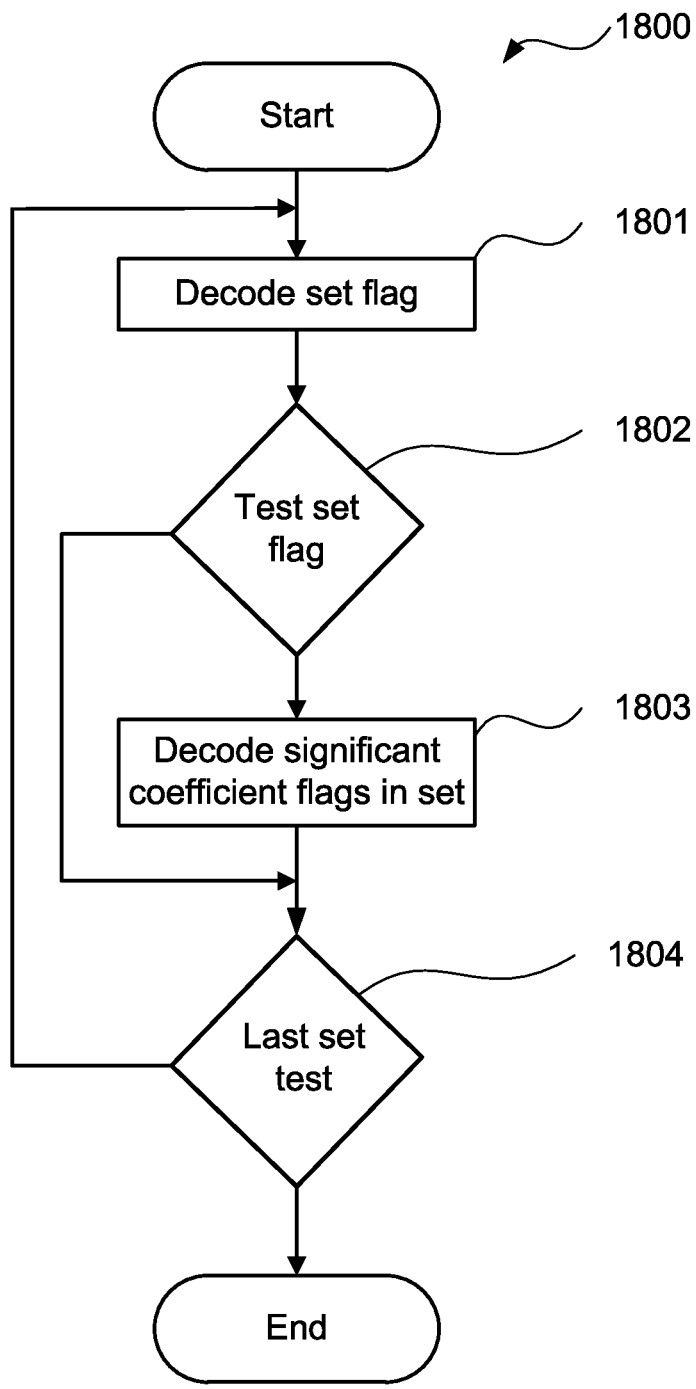
FIG. 18 is a flowchart showing an alternative method for decoding the significance map of FIG. 16.

Advantageously, the approach disclosed in FIGS. 16, 17 and 18 permit the inverse binariser 503 to decode the significance map whilst invoking fewer operations of the arithmetic decoder 501. Further advantage may be obtained by defining the sets such that the set size is varied in accordance with the spatial location of the corresponding set within the significance map. Such an arrangement takes advantage of the statistical property that nonzero-valued residual coefficients congregate in the upper-left region of the transform unit (TU).While the arrangement has been described with reference to the entropy decoder 202, the arrangement is equally applicable to the entropy encoder 104.

The arrangements presently disclosed provide for encoding and decoding of significance maps based upon sets or groups of flag values. The sets are founded upon a scan pattern being used and conclude with a set including the last significant coefficient flag. As will be apparent from a comparison of the examples seen in FIGS. 14C and 14D, the presently disclosed arrangements adds a number of elements to the one-dimensional list of flags to be encoded, whilst adding the need to encode a set index value to assist in decoding.

Counterintuitively, these additional elements to be encoded may not adversely increase the computational overhead for encoding and/or decoding. Firstly, the added elements include the last significant coefficient flag. This element is traditionally separately encoded and, according to the present disclosure, need not be separately encoded. Secondly the remaining added elements from the significance map are all zeros, and those skilled in the art will appreciate that the arithmetic encoding and decoding of zeros in regions of the transform unit (TU) that are unlikely to contain significant coefficients contribute very little to computational overhead, but significantly contributes minimally to the bitstream, thereby maintaining coding efficiency. Thirdly in the conventional approach, the coordinate of the last significant coefficient flag is encoded as a coordinate pair of values, whereas according to the present disclosure, this is substituted by a simple index set value. Encoding/decoding a single index value consumes fewer computational resources than encoding/decoding a coordinate pair of values.

The net effect of the presently disclosed arrangements is a reduction in computational overhead for encoding and decoding that is able to be implemented within the context of existing coding schema.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

This application claims priority from Australian Patent Application No. 2011236109 filed Oct. 18, 2011, which is hereby incorporated by reference herein in its entirety.

We claim:

1. A method of decoding a significance map from an encoded bitstream, the method comprising:
   identifying a scan pattern over which a plurality of discrete sets of flags are arranged;
   decoding a set index value from the bitstream, the set index value identifying a set of flags from the plurality of discrete sets of flags, the set of flags including a last significant coefficient flag of the significance map, and at least one zero-valued significant coefficient flag located after the last significant coefficient flag in a forward direction of the scan pattern, wherein each significant coefficient flag of the significance map is associated with one of the plurality of discrete sets of flags; and
   decoding individual significance flags and writing the decoded values into the significance map according to the scan pattern and including all significance flags located before the identified set of flags, according to the identified scan pattern, and for an entirety of the identified set of flags.

2. The method according to claim 1 wherein the decoding proceeds according to a forward scan pattern and concludes with a decoding of the entirety of the specified set.

3. The method according to claim 2 wherein the scan pattern is one of horizontal, vertical, diagonal and zig-zag.

4. The method according to claim 1 wherein the decoding proceeds according to a backward scan pattern and commences with a decoding of the entirety of the specified set.

5. The method according to claim 4 wherein the scan pattern is one of horizontal, vertical, diagonal and zig-zag.

6. The method according to claim 1 wherein the set of flags has at least one boundary coincident with a boundary of a transform unit associated with the significance map.

7. Computer apparatus adapted to perform the method of claim 1.

8. A method of encoding a significance map in a digital signal coding system, the method comprising:
   identifying a scan pattern over which a plurality of discrete groups of flags are arranged, the plurality of discrete groups of flags providing a list of significant coefficient flags;
   identifying a group of significant coefficient flags from the plurality of discrete groups of flags, the group of significant coefficient flags including a last significant coefficient flag and at least one zero-valued significant coefficient flag located after the last significant coefficient flag in a forward direction of the scan pattern and referencing the identified group with a set index value, wherein each significant coefficient flag of the significance map is associated with one of the plurality of discrete groups of flags;

scanning the significance map in accordance with the scan pattern including all significance flags located before the identified group, according to the identified scan pattern, up to and including an entirety of the identified group; and encoding the scanned flag values.

9. The method according to claim 8 wherein the scan pattern is one of horizontal, vertical, diagonal and zig-zag.

10. The method according to claim 8 wherein boundaries of the group occur at the boundary of the significance map.

11. The method according to claim 8 wherein at least one said group comprises at least two diagonal scans of the significance map.

12. A method of encoding a significant flag boundary for a significance map of a transform unit, the transform unit encoding residual coefficients of video data, the method comprising:

providing a scan pattern that determines the encoding order for significance flags of the transform unit;

identifying a location of a last significant flag to encode in the transform unit;

selecting, based on the scan pattern, a set from a plurality of discrete sets arranged over the scan pattern, the selected set including the identified location of the last significant flag and the location of at least one zero-valued significant coefficient flag located after the last significant flag in a forward direction of the scan pattern, each of the predetermined sets including a plurality of transform unit locations, wherein each significance coefficient flag of the significance map is associated with one of the plurality of discrete sets; and storing an index of the selected set as a reference to a plurality of the transform locations to encode the significant flag boundary, the index being an only reference to the location of the last significant flag.

13. The method according to claim 12 wherein each of the plurality of predetermined sets is a scan line of the transform unit.

14. A non-transitory computer readable storage medium having a program recorded thereon, the program being executable by computerized apparatus to encode a significance map in a digital signal coding system, said program comprising:

code for identifying a scan pattern over which a plurality of discrete groups of flags are arranged, the plurality of discrete groups of flags providing a list of significant coefficient flags;

code for identifying a group of significant coefficient flags from the plurality of discrete groups of flags, the identified group including a last significant coefficient flag and at least one zero-valued significant coefficient flag located after the last significant coefficient flag in the forward direction of the scan pattern, and referencing the identified group with a set index value, wherein each significant coefficient flag of the significance map is associated with one of the plurality of discrete groups of flags;

code for scanning the significance map in accordance with the scan pattern including all significance flags located before the identified group, according to the identified scan pattern, up to and including an entirety of the identified group; and code for encoding the scanned flag values.

15. A non-transitory computer readable storage medium having a program recorded thereon, the program being executable by computerized apparatus to decode a significance map from an encoded bitstream, the program comprising:

code for identifying a scan pattern over which a plurality of discrete sets of flags are arranged;

code for decoding a set index value from the bitstream, the set index value identifying a set of flags from the plurality of discrete sets of flags, the set of flags including a last significant coefficient flag of the significance map and at least one zero-valued significant coefficient flag located after the last significant coefficient flag in the forward direction of the scan pattern, wherein each significant coefficient flag of the significance map is associated with one of the plurality of discrete sets of flags; and code for decoding individual significance flags and writing the decoded values into the significance map according to the scan pattern and including all significance flags located before the identified set of flags, according to the identified scan pattern, and for an entirety of the identified set of flags.

16. A video decoding apparatus comprising:

an entropy decoder for receiving an encoded video bitstream and operative to decode a significance map by:

identifying a scan pattern over which a plurality of discrete sets of flags are arranged;

decoding a set index value from the bitstream, the set index value identifying a set of flags from the plurality of discrete sets of flags, the set of flags including a last significant coefficient flag of the significance map and at least one zero-valued significant coefficient flag located after the last significant coefficient flag in the forward direction of the scan pattern, wherein each significant coefficient flag of the significance map is associated with one of the plurality of discrete sets of flags; and decoding individual significance flags and writing the decoded values into the significance map according to the scan pattern and including all significance flags located before the identified set of flags, according to the identified scan pattern, and for an entirety of the identified set of flags.

17. The apparatus according to claim 16 wherein the decoder comprises an arithmetic decoder, a context model and an inverse binariser, the arithmetic decoder receiving the bitstream and decoding the set index value using the context model, the decoded set index the context model and the scan pattern being used by the inverse binariser to decode the individual significance flags from the bitstream.

* * * * *